United States Patent
Kojima et al.

(10) Patent No.: US 11,847,356 B2
(45) Date of Patent: Dec. 19, 2023

(54) APPARATUS HAVING A FUNCTION OF RESERVING A SHEET FEEDING UNIT AND INFORMATION PROCESSING APPARATUS CONNECTED TO THE SAME

(71) Applicant: CANON KABUSHIKI KAISHA, Tokyo (JP)

(72) Inventors: Yurino Kojima, Chiba (JP); Yasuhiro Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/840,428

(22) Filed: Jun. 14, 2022

(65) Prior Publication Data

US 2022/0405023 A1  Dec. 22, 2022

(30) Foreign Application Priority Data

Jun. 16, 2021  (JP) .................. 2021-100276

(51) Int. Cl.
*G06F 3/12* (2006.01)
*G03G 15/00* (2006.01)

(52) U.S. Cl.
CPC ........... *G06F 3/1203* (2013.01); *G03G 15/50* (2013.01); *G06F 3/1239* (2013.01); *G06F 3/1204* (2013.01)

(58) Field of Classification Search
CPC .... G06F 3/1203; G06F 3/1239; G06F 3/1285; G03G 15/50; G03G 15/5083; G03G 15/6508
USPC ........................................... 358/1.15
See application file for complete search history.

(56) References Cited

U.S. PATENT DOCUMENTS

| | | | |
|---|---|---|---|
| 2004/0005159 A1* | 1/2004 | Ito | G03G 15/0266 399/50 |
| 2019/0009595 A1* | 1/2019 | Kawamura | H04N 1/00925 |
| 2022/0405023 A1* | 12/2022 | Kojima | G03G 15/50 |

FOREIGN PATENT DOCUMENTS

JP  2020-181220 A  11/2020

* cited by examiner

*Primary Examiner* — Darryl V Dottin
(74) *Attorney, Agent, or Firm* — Canon U.S.A., Inc., IP Division

(57) ABSTRACT

An apparatus includes at least one memory and at least one processor functioning to reserve a sheet feeding unit of an image forming apparatus and provide information indicating that the sheet feeding unit is reserved.

12 Claims, 20 Drawing Sheets

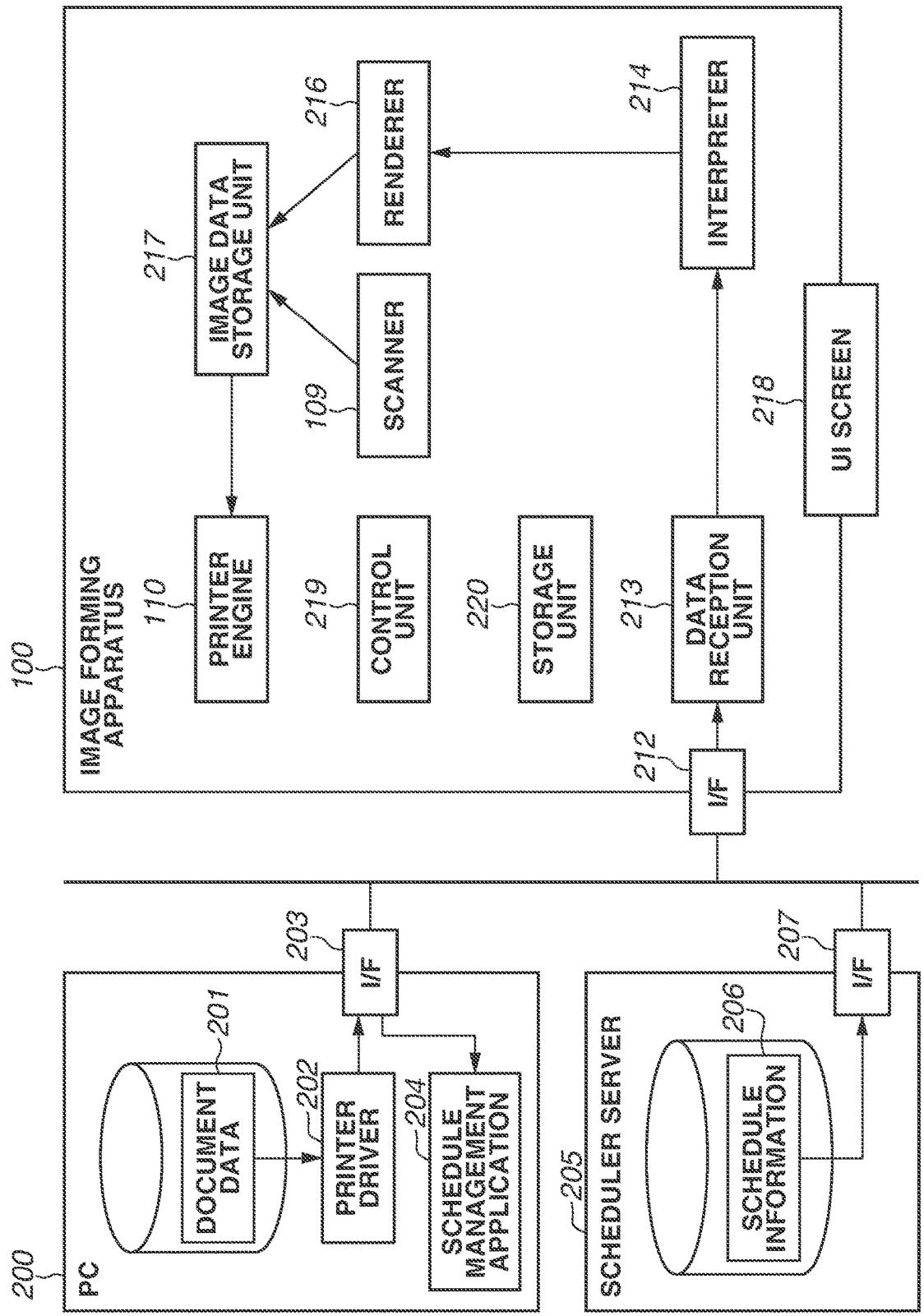

IMAGE FORMING APPARATUS 100

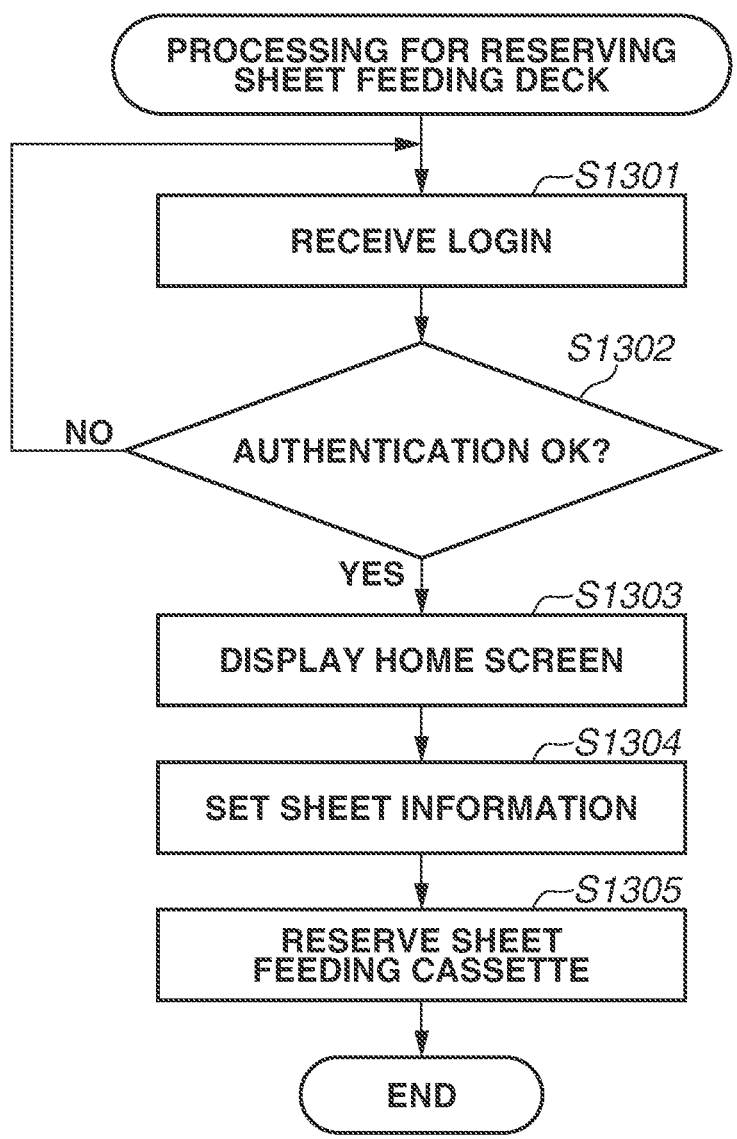

APPARATUS HAVING A FUNCTION OF RESERVING A SHEET FEEDING UNIT AND INFORMATION PROCESSING APPARATUS CONNECTED TO THE SAME

BACKGROUND

Field

The present disclosure relates to an apparatus having a function of reserving a sheet feeding unit and an information processing apparatus connected to the apparatus.

Description of the Related Art

Most image forming apparatuses include a plurality of sheet feeding cassettes, and are configured to enable sheets in different sizes or types to be loaded in the sheet feeding cassettes. This configuration enables a user to carry out a printing operation using a special sheet by loading it in a sheet feeding cassette and inputting a print job that specifies the sheet feeding cassette (refer to Japanese Patent Application Laid-Open No. 2020-181220).

In some cases, before the user executes the print job after loading the special sheet that the user wants to use in the sheet feeding cassette, a print job of another user was input first and the special sheet was accidentally used. One method of guarding against this situation from occurring is, for example, putting a notice on the image forming apparatus with the special sheet in the sheet feeding cassette that other users should refrain from using the image forming apparatus for a certain period of time. In the case of other users remotely using the image forming apparatus, this method is not effective.

SUMMARY

According to an aspect of the present disclosure, an apparatus includes at least one memory and at least one processor functioning to reserve a sheet feeding unit of an image forming apparatus and provide information indicating that the sheet feeding unit is reserved.

Further features will become apparent from the following description of exemplary embodiments with reference to the attached drawings.

BRIEF DESCRIPTION OF THE DRAWINGS

FIG. 2 is a configuration diagram and a functional block diagram of an apparatus according to the exemplary embodiment.

FIG. 13 is a flowchart illustrating a procedure of adding the reservation information.

DESCRIPTION OF THE EMBODIMENTS

Exemplary embodiments for implementing the present disclosure will be described in the following description with reference to the drawings.

In the following description, an image forming apparatus according to the present disclosure will be described. Examples of the image forming apparatus include, but are not limited to, a printer, a copying machine, a facsimile apparatus, and a multi-function peripheral including the functions provided by the printer, copying machine, and facsimile apparatus. The image forming apparatus has a function of forming images on sheets serving as a recording medium, i.e., a print function.

Figure 1A:
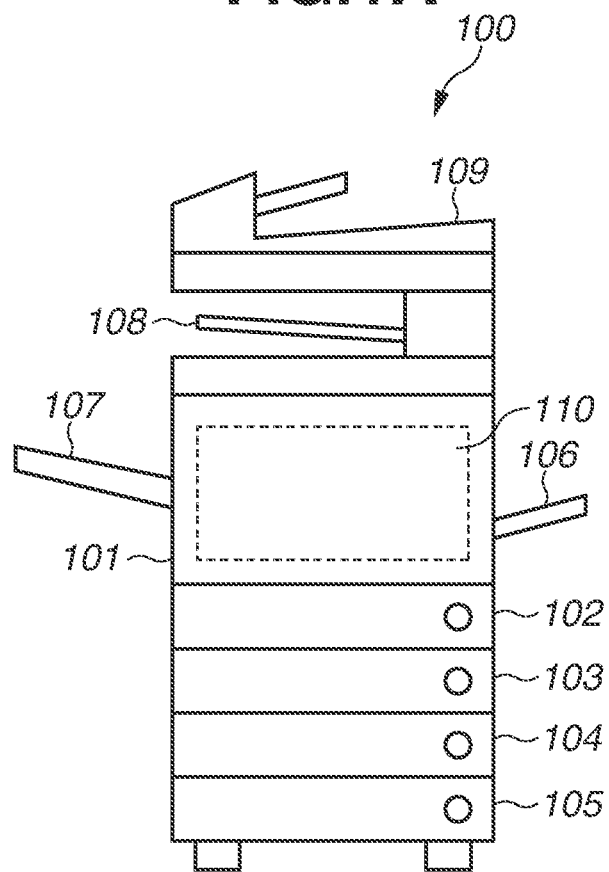
FIG. 1A is a front view of an image forming apparatus according to an exemplary embodiment and FIG. 1B is a schematic view of a printer engine.

An image forming apparatus 100 illustrated in FIG. 1A is a multi-function peripheral that forms images on sheets. Examples of sheets include paper sheets, envelopes, plastic film sheet such as a sheet for an overhead projector (OHP), and a cloth sheet. Terms such as "paper" or "paper feeding" will be used in the following description and associated drawings, but are intended as references to a general sheet including a non-paper sheet unless otherwise specifically stated.

The image forming apparatus 100 includes a printer unit 101, a scanner unit 109, a plurality of sheet feeding cassettes 102, 103, 104, and 105, a manual feeding tray 106, and sheet discharge trays 107 and 108. The scanner unit 109, as an image reading device, optically scans a document and converts it into electronic image information by a photoelectric conversion device employing a charge-coupled device (CCD). In the printer unit 101, the printer engine 110, which is an example of an image forming unit, forms an image on a sheet based on image information input from the scanner unit 109, an external host computer, a data server, or other sources. Each of the sheet feeding cassettes 102 to 105 contains sheets therein, and the manual feeding tray 106 supports sheets stacked on its tray. The sheets stored in the sheet feeding cassettes 102 to 105 and the manual feeding tray 106 are fed to the printer engine 110 while being separated one-by-one by a sheet feeder unit (not illustrated). All of the sheet feeding cassettes 102 to 105 and the manual feeding tray 106 are examples of a sheet feeding deck that stores sheets to be fed to the image forming unit. The sheet with the image formed thereon by the printer engine 110 is discharged onto the sheet discharge tray 107 or the sheet discharge tray 108. The sheet feeding cassettes 102 to 105 and manual feeding tray 106 can be collectively referred to as "sheet feeding units".

Figure 1B:
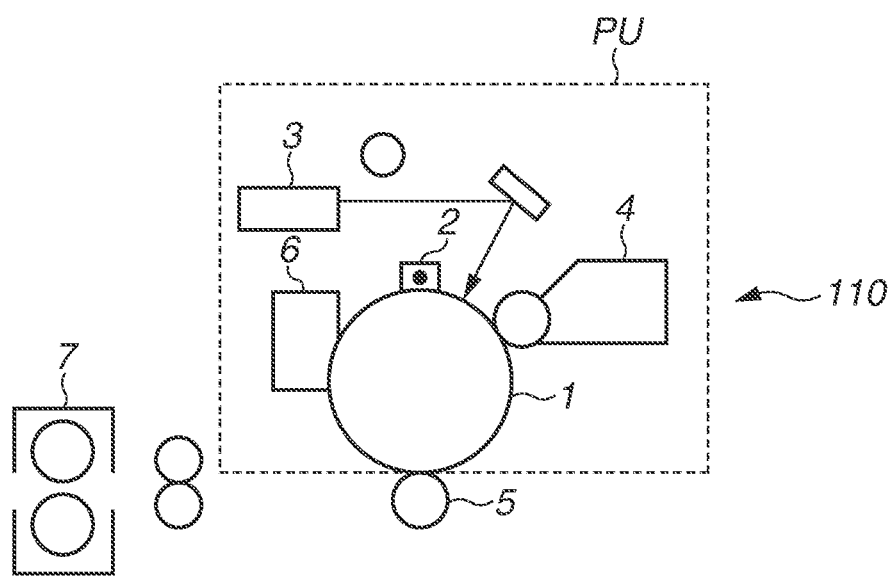

As illustrated in FIG. 1B, the printer engine 110 includes an electrophotographic image forming unit processing unit (PU). The image forming unit PU includes a photosensitive drum 1, which is a drum-like photosensitive member, a charging device 2, an exposure device 3, a development device 4, and a cleaning device 6. In response to a request to start an image forming operation to the printer engine 110, the charging device 2 evenly charges the surface of the photosensitive drum 1 and the exposure device 3 scans the photosensitive drum 1 with laser light, thereby forming an electrostatic latent image on the drum surface. The development device 4 develops the electrostatic latent image into a toner image by supplying charged toner to the photosensitive drum 1. The toner image borne on the photosensitive drum 1 is transferred onto the sheet by a transfer device 5. The toner image transferred on the sheet is fixed onto the sheet by a fixing device 7.

FIG. 2 is a diagram illustrating the configuration of a print resource reservation system, which is an example of an exemplary embodiment. The image forming apparatus 100 is connected to a wired or wireless network, and communicates with an information processing apparatus such as a personal computer (PC) 200 and a scheduler server 205.

A printer driver 202 is installed in the PC 200 and generates a job for instructing the image forming apparatus 100 to form an image (hereinafter referred to as a print job). The printer driver 202 generates the print job written in a page description language (PDL) based on, for example, document data received from a document generation application in the PC 200. PDL is an abbreviation for a page description language such as PostScript® (PS), Printer Command Language® (PCL), or Laser Beam Printer (LBP) Image Processing System® (LIPS). The PC 200 also includes a control unit such as a central processing unit (CPU), and a storage unit such as a read-only memory (ROM), a random access memory (RAM) (a rewritable memory), and a hard disk drive (HDD) (not illustrated). The printer driver 202 transmits the generated print job to the image forming apparatus 100.

The PC 200 includes a schedule management application 204. The schedule management application 204 receives information stored by the scheduler server 205, which will be described below, and displays it to a user via the PC 200. That enables the user to access the scheduler server 205 via the schedule management application 204.

The scheduler server 205 stores user information registered with an authentication system (not illustrated) and schedule information about each user, and includes a program that manages the schedule information about each user. As an example of the management of the schedule information, the scheduler server 205 enables users to add a new schedule, change a schedule, and search and view the schedule information about another user.

The user in the scheduler server 205 is not limited to an individual person or a person having a shared PC, and can also include facilities such as a meeting room or a whiteboard. The schedule associated with facilities can be managed by setting individuals or persons having shared PCs as administrators of a particular facility. The image forming apparatus as the facility can also be registered as the user.

The details of the image forming apparatus 100 will now be described with reference to FIG. 2. The image forming apparatus 100 includes a control unit 219 that controls a data reception unit 213, an interpreter 214, a renderer 216, along with a storage unit 220, and an image data storage unit 217 that temporarily or permanently store data. The image data transmitted from the PC 200 is stored after being converted into image data in a raster format by the data reception unit 213, interpreter 214, and renderer 216. The image information read from the document by the above-described scanner unit 109 is also stored as the image data. The image data is transmitted to the printer engine 110 as video signals, and used in the image forming operation by the printer engine 110.

The control unit 219 is a central processing unit that controls the image forming apparatus 100, and reads out control programs stored in the storage unit 220 and executes them. In the following description, each step in a control process of the image forming apparatus 100 is performed by the control unit 219 unless otherwise specifically stated. The storage unit 220, includes a ROM, a RAM, an HDD, and/or the like, and is used as a work memory when the control unit 219 runs control programs in addition to temporarily or permanently storing the control programs and the setting information about the image forming apparatus 100.

The image forming apparatus 100 also includes a user interface (UI) screen 218 as a display unit that displays information. The display unit of the UI screen 218 includes a touch panel equipped with a software key function and an operation unit including hardware keys such as a numeric keypad and a print start button.

Details of the scheduler server 205 and the schedule management application 204 that displays the information according to the present exemplary embodiment will now be described with reference to FIGS. 3 and 4. A communication apparatus such as a PC or a smart-phone can confirm the information stored by the scheduler server 205 by operating the scheduler server 205 via the schedule management application 204.

In the present exemplary embodiment, the image forming apparatus 100 can be registered as one user, and can also be registered by print resource in the image forming apparatus 100 as one user. Print resources refer to, for example, the sheet feeding cassettes 102 to 105 and the manual feeding tray 106, the sheet discharge trays 107 and 108, the scanner unit 109, and the printer engine 110 in the image forming apparatus 100.

Figure 3:
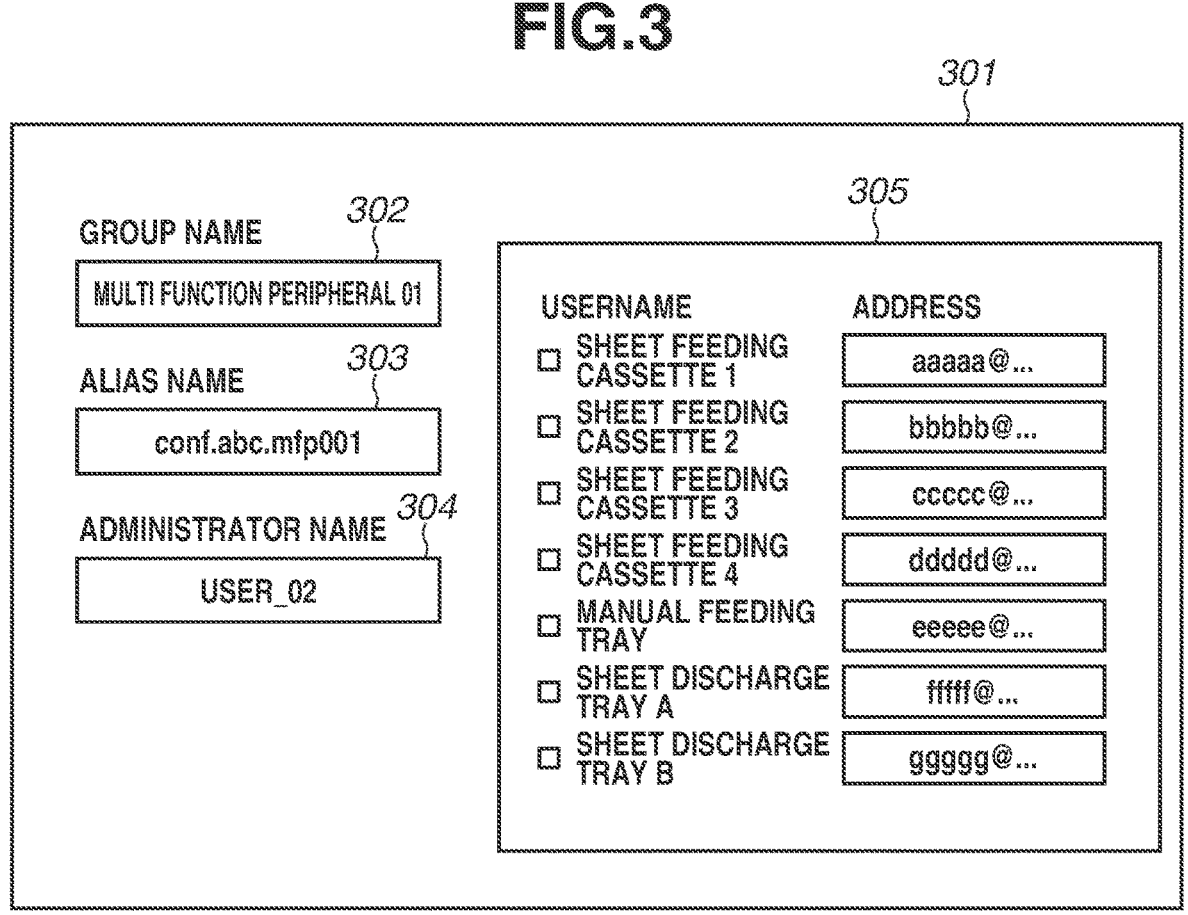
FIG. 3 illustrates a display example of user information grouping information screen of a schedule management application.
Figure 4:
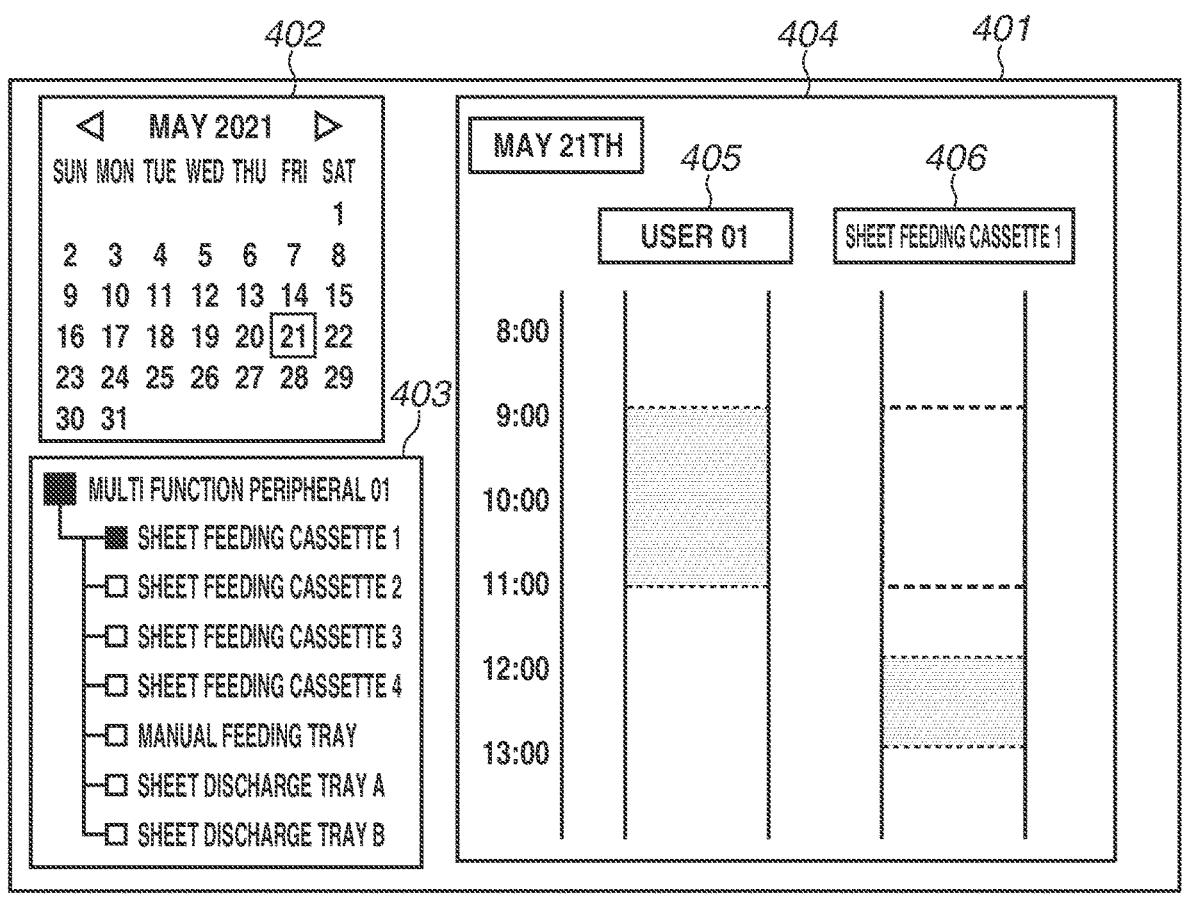
FIG. 4 illustrates a display example of a reservation information indication screen of the schedule management application.

FIG. 3 illustrates a screen of the schedule management application 204 when the image forming apparatus 100 is registered by print resource.

First, each print resource is registered as a user, and a group "Multi Function Peripheral 01" is generated by setting a group name 302, an alias name 303 that serves as an electronic mail address, and a name 304 of an administrator that manages the registered group on a user information setting screen 301 illustrated in FIG. 3. The user information setting screen 301 is presented by displaying a screen generated by the schedule management application 204 on the PC 200. Sheet Feeding Cassettes 1 to 4, Manual Feeding Tray, and Sheet Discharge Trays A and B are registered with the generated group as a member (a node) as each print resource user. In the present example, Multi-Function Peripheral 01, Sheet Feeding Cassettes 1 to 4, Manual Feeding Tray, and Sheet Discharge Trays A and B correspond to the image forming apparatus 100, the sheet feeding cassettes 102 to 105, the manual feeding tray 106, and the sheet discharge trays 107 and 108, respectively. Once the members are registered with the generated group, the username of each print resource and the electronic mail address corresponding to the username are displayed in a member list 305, and each print resource can be operated as a member included in the image forming apparatus 100. This enables the schedule to be managed by print resource in the image forming apparatus 100 instead of being managed for each image forming apparatus.

Next, a schedule confirmation screen 401 displayed by the schedule management application 204 will be described with reference to FIG. 4. The current date and a calendar are displayed in a calendar screen 402. A user list selected based on a search, a favorite, or the like is displayed in a user display screen 403, and the schedule information for a user selected by the user's operation can be confirmed therein. Schedule information 405 for the user logged into the PC 200 and schedule information 406 for the user selected in the user display screen 403 are displayed in a schedule display screen 404. In the present example, the username of the user logged into the PC 200 is "User 01" and Sheet Feeding Cassette 1 is selected. The schedule information displayed in the schedule display screen 404 can be changed by an operation performed by the user on the schedule confirmation screen 401 and the user display screen 403. Schedule information for a plurality of users can also be displayed at the same time.

A first exemplary embodiment of reserving print resources will now be described.

A process in which print resources in the image forming apparatus 100 are reserved will be described with reference to FIGS. 4, 5, and 6. The control unit of the PC 200 executes the schedule management application 204 and exchanges information with the scheduler server 205 via the schedule management application 204 to perform the process illustrated in FIG. 6 as described below. In the present example, Sheet Feeding Cassette 1 is reserved as a print resource. In addition, the user who performs a reservation operation is referred to as a reservation user, where the reservation user in the present exemplary embodiment is User 01.

Figure 6:
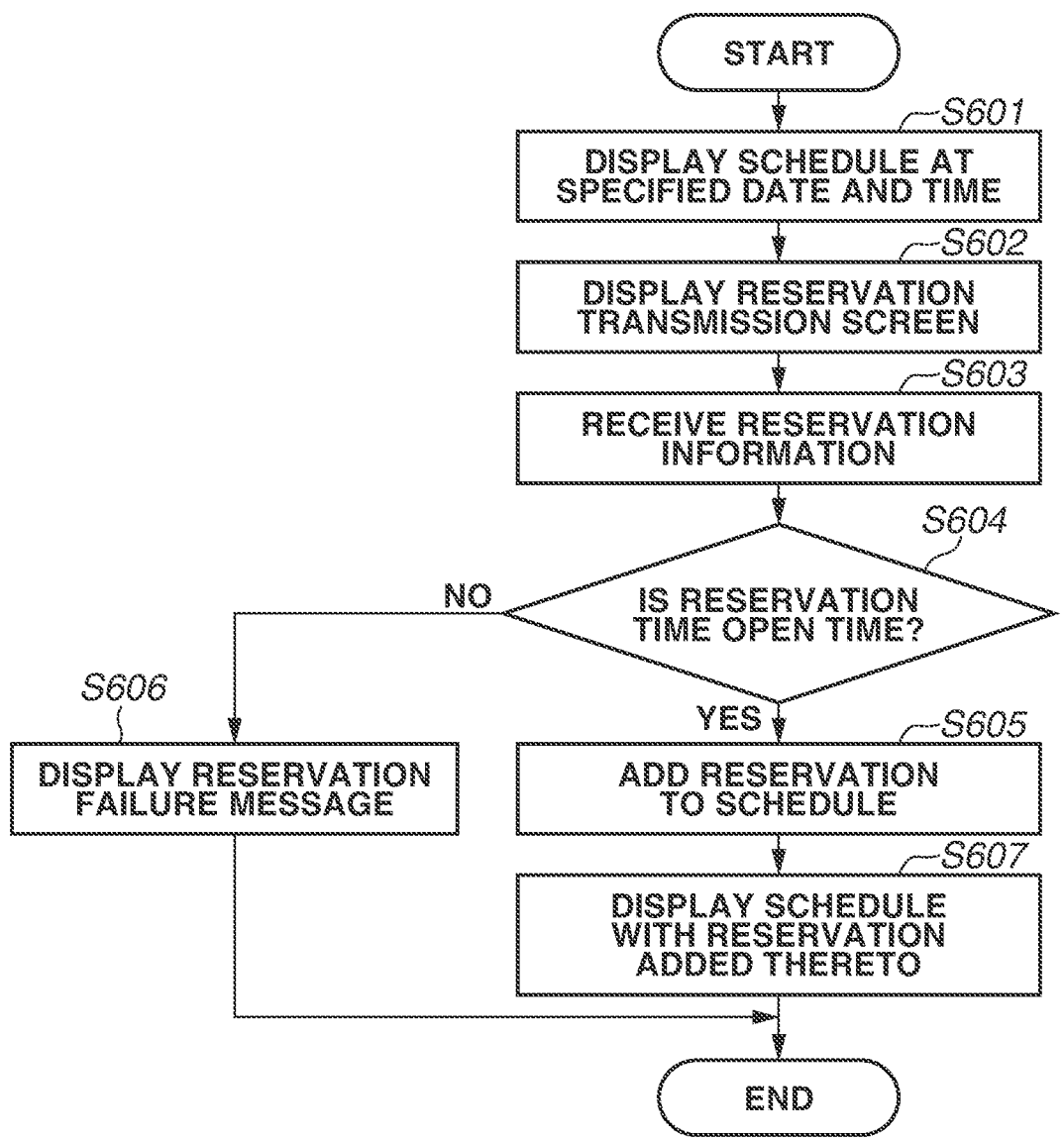
FIG. 6 is a flowchart illustrating a procedure of adding reservation information.

Turning to FIG. 6, at the start of the illustrated process, the print resource reservation system is in a state that the schedule management application 204 is started on the PC 200 and the schedule information 405 for User 01 alone is displayed on the schedule display screen 404. In step S601, the scheduler server 205 receives an operation of the reservation user made via the schedule management application 204, and displays the schedule of Sheet Feeding Cassette 1 of Multi Function Peripheral 01, which is the reservation target, at the specified date and time, thereby creating the state illustrated in FIG. 4. On the display, User 01 can compare the user's own schedule and the schedule of Multi Function Peripheral 01 at the specified date and time.

Figure 5:
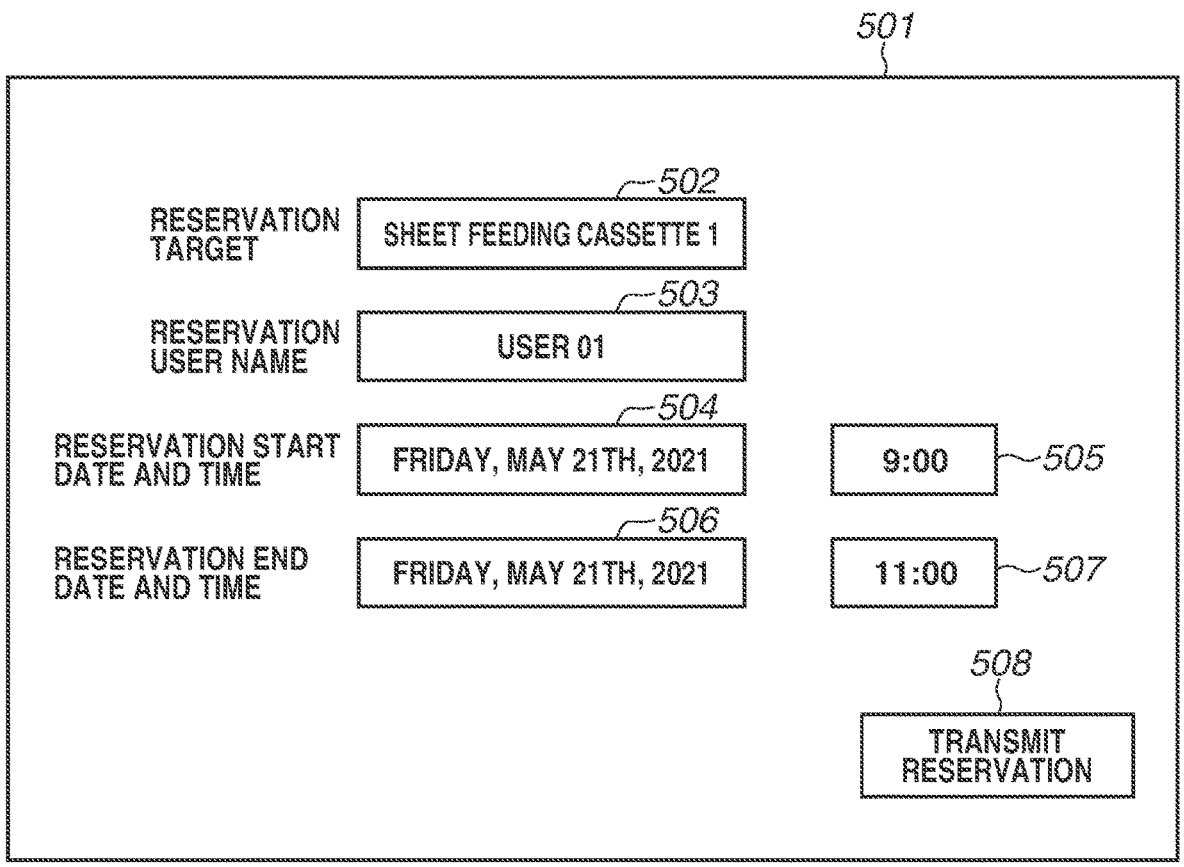
FIG. 5 illustrates a display example of a reservation transmission screen of the schedule management application.

In step S602, based on an operation performed by User 01, the scheduler server 205 displays a new reservation transmission screen 501 with Sheet Feeding Cassette 1 set as a transmission destination as illustrated in FIG. 5. Examples of operations performed by User 01 include, but are not limited to, selecting the time to reserve in the schedule information 406 for Sheet Feeding Cassette 1 (the rectangular portion indicated by a dotted line in 406 in FIG. 4). A reservation target name 502, a reservation user name 503, a reservation start date and time 504 and 505, and a reservation end date and time 506 and 507 are displayed on the reservation transmission screen 501. The reservation transmission screen 501 enables User 01 to change the reservation target and the reservation date and time via this screen.

In step S603, the scheduler server 205 receives new reservation information from the PC 200 via the schedule management application 204. This is generated by User 01's selecting a reservation transmission button 508 in the reservation transmission screen 501.

The above-described reservation information includes username information about User 01 that the scheduler server 205 saves as a "name of the user who makes the reservation" (the reservation user name 503 in FIG. 5), username information about Sheet Feeding Cassette 1 as a "reserved print resource name" (the reservation target name 502 in FIG. 5), and reservation time information input by User 01 as a "reservation time" (a date and time calculated based on the reservation start date and time 504 and 505 and the reservation end date and time 506 and 507 in FIG. 5).

In step S604, the scheduler server 205 compares the reservation time information in the reservation information received in step S603 and the schedule of Sheet Feeding Cassette 1 corresponding to this time information, and determines whether the schedule is open at the reservation time information for Sheet Feeding Cassette 1. More specifically, if User 01 transmits the reservation specifying the period from 9 o'clock to 11 o'clock as the reservation time, the scheduler server 205 checks whether the schedule of Sheet Feeding Cassette 1 is open from 9 o'clock to 11 o'clock. If the schedule is determined to be open (YES in step S604), the processing proceeds to step S605. Otherwise (NO in step S604), the processing proceeds to step S606.

If the schedule is determined to be open in step S604 (YES in step S604), in step S605, the scheduler server 205 registers the reservation information with the schedule of Sheet Feeding Cassette 1.

If the schedule is determined to be unavailable in step S604 (NO in step S604), in step S606, the scheduler server 205 notifies the reservation user that the reservation is unacceptable because the received new reservation information does not correspond to an open time of Sheet Feeding Cassette 1. The reservation operation then ends. Examples of the notification method include methods such as displaying a pop-up screen on the screen of the PC 200 and/or transmitting an electronic mail from the scheduler server 205 to User 01. After being notified that the reservation is unacceptable, User 01 can search for another open time of Sheet Feeding Cassette 1 and perform the reservation operation again on the schedule management application screen.

In step S607, the scheduler server 205 displays the schedule of the sheet feeding cassette 102 with the reservation information about User 01 added thereto on the PC 200 via the schedule management application 204. The reservation operation then ends. As a result of the above-described processing, the reservation user can be notified that the reservation transmitted by the reservation user is accepted and also indicate the reservation user's own reservation information to users not present near the image forming apparatus 100.

As illustrated in FIG. 2, the scheduler server 205 and the image forming apparatus 100 are connected via interfaces 207 and 212, thereby enabling exchange of the reservation information between the two.

Figure 7:
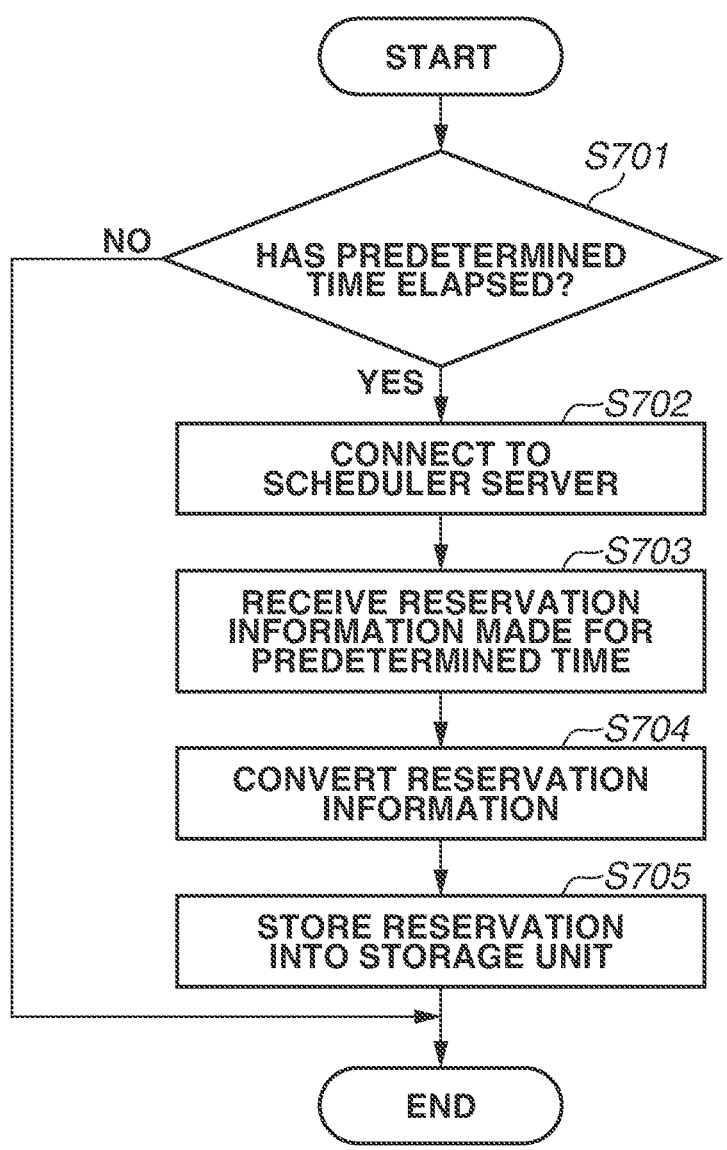
FIG. 7 is a flowchart illustrating a procedure of storing the reservation information.

A process in which the image forming apparatus 100 receives the reservation information from the scheduler server 205 and stores it into the storage unit 220 will now be described with reference to FIG. 7. The control unit 219 of the image forming apparatus 100 executes programs stored in the storage unit 220 to implement the process described below.

In step S701, the image forming apparatus 100 determines whether a preset time has elapsed since the last time the image forming apparatus 100 confirmed the reservation. If the predetermined time is determined to have elapsed (YES in step S701), the processing proceeds to step S702. Otherwise (NO in step S701), the storage operation ends. In that case, the image forming apparatus 100 restarts the present process using, for example, an internal clock.

If the predetermined time is determined to have elapsed in step S701 (YES in step S701), in step S702, the image forming apparatus 100 connects to the scheduler server 205 in order for the image forming apparatus 100 to begin communicating with the schedule server 205.

In step S703, the image forming apparatus 100 receives reservation information stored after the time when the image forming apparatus 100 previously connected to the scheduler server 205. The reservation information received by the image forming apparatus 100 includes the "name of the user who makes the reservation", the "reserved print resource name", and the "reserved time".

In step S704, the image forming apparatus 100 converts the information representing the reservation information received in step S703 into reservation information recognizable by the control unit 219 using a server information management table (not illustrated). The server information management table is a table used to convert information received from the scheduler server 205 into a content recognizable by the control unit 219, and is stored in the storage unit 220. In step S705, the image forming apparatus 100 stores the reservation information converted in step S704 in a resource information management table (not illustrated) used to manage information about the print resource that is the reservation target.

An example of the resource information management table will be now be provided with reference to a resource information management table for the sheet feeding cassettes illustrated in Table 1 below. The resource information management table stores the settings regarding each sheet feeding cassette. A sheet size 2002 in the table indicates the size automatically detected by each sheet feeding deck when the sheet is loaded therein or set by a user. A sheet type 2003 indicates the sheet type set by the user, and a sheet remaining quantity 2004 indicates the remaining quantity detected by each sheet feeding deck on a scale of 1 to 4. A reservation user 2005 in the table indicates the name of the user who reserves the sheet feeding cassette, and a reservation time 2006 indicates the time for which the user registered as the reservation user 2005 reserves the target sheet feeding cassette. The sheet size indicates information usable to identify the length of the long side and the length of the short side of the sheet and the orientation of the sheet with respect to the sheet conveyance direction inside the image forming apparatus 100. The sheet type indicates the classification based on a characteristic of the sheet other than the size, such as the material properties (e.g., the grammage, whether a surface treatment is applied to the sheet, the material, etc.), the form (e.g., index paper or a loose leaf), and the special purpose (e.g., an envelope) for the sheet. The characteristics of the sheet including the sheet size and the sheet type will be collectively referred to as attributes of the sheet.

In step S705, the image forming apparatus 100 stores information indicating the "name of the user who makes the reservation" and information indicating the "reserved time" into the reservation user 2005 and the reservation time 2006, respectively, based on the reservation information. Blank fields in the reservation user 2005 and the reservation time 2006 in Table 1 indicate that the sheet feeding cassette is available for anyone. The processing then ends.

The above-described process enables the image forming apparatus 100 to store the received reservation information in a storage unit corresponding to the resource reserved on the scheduler server 205.

TABLE 1

Sheet Feeding Cassette Information Management Table after Reservation Information is Stored

| Resource Name (2001) | Sheet Size (2002) | Sheet Type (2003) | Sheet Remaining Quantity (2004) | Reservation User (2005) | Reservation Time (2006) |
|---|---|---|---|---|---|
| Sheet Feeding Cassette 102 | A3 | Coated Paper | 25% | USER 01 | 9:00-11:00 |
| Sheet Feeding Cassette 103 | A4 | Heavy Paper 2 | 100% | | |
| Sheet Feeding Cassette 104 | A3 | Plain Paper 1 | 50% | | |
| Sheet Feeding Cassette 105 | A4 | Plain Paper 1 | 100% | | |
| Manual Feeding Tray 106 | — | — | 0% | | |

As described above, a resource of the image forming apparatus 100 can be reserved using the scheduler server 205, and, information for the reservation can be stored into the storage unit 220 of the image forming apparatus 100.

According to the present exemplary embodiment, storing the reservation information from the schedule server 205 in the storage unit 220 in the image forming apparatus 100 enables the image forming apparatus 100 to refer to the reservation information. The image forming apparatus 100 is then able to perform exclusion processing on other users for a reserved print resource by referring to the information management table of the reserved print resource in the storage unit 220 in use of the image forming unit. The exclusion processing will be described in detail below.

Figure 8:
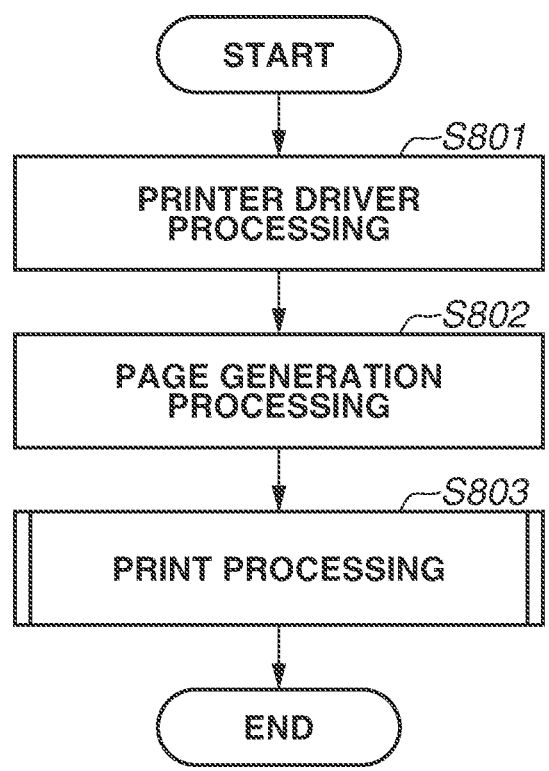
FIG. 8 is a flowchart illustrating a procedure of a print job.
Figure 9:
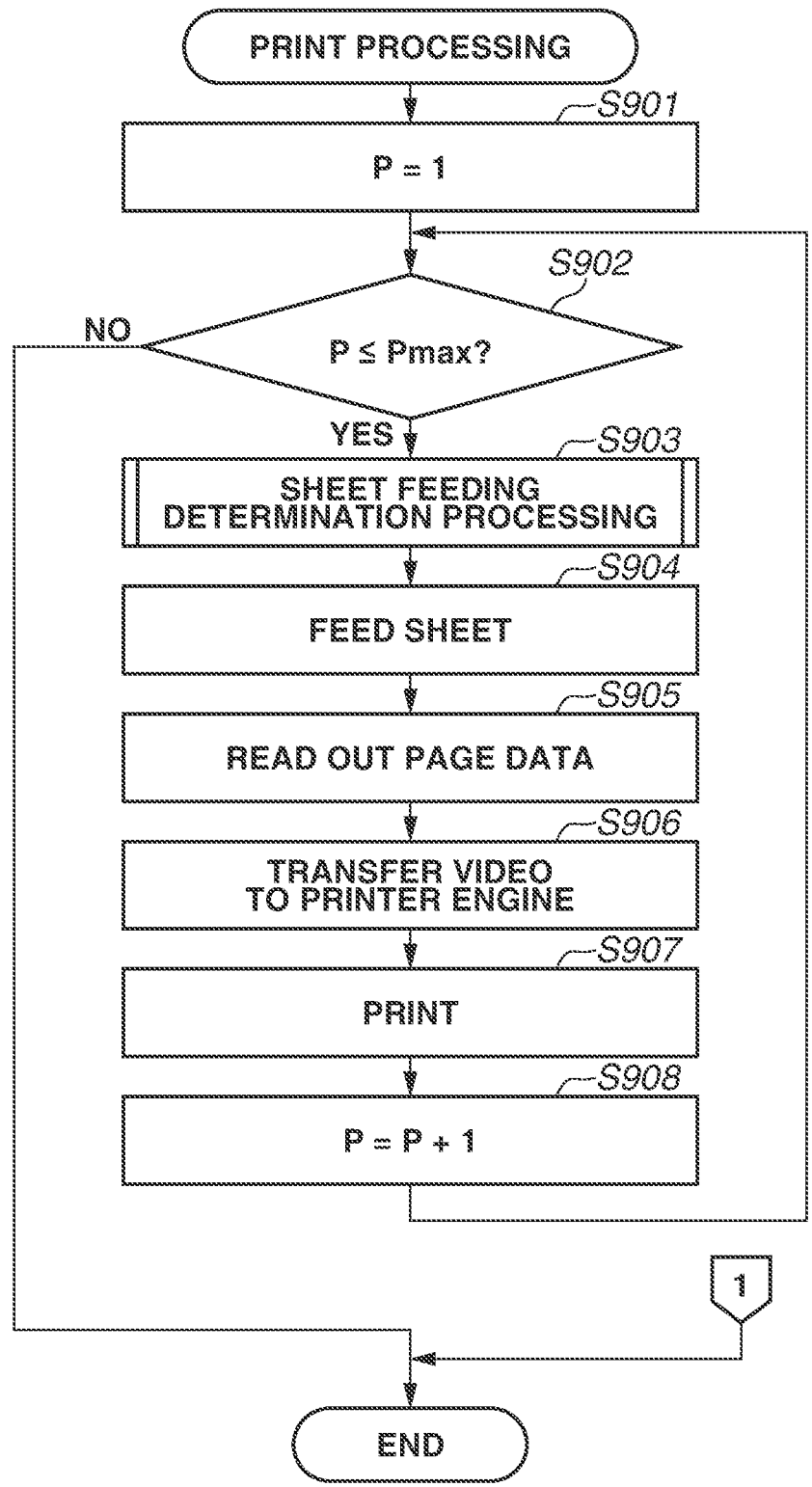
FIG. 9 is a flowchart illustrating a procedure of print processing.

FIG. 8 and FIG. 9 are flowcharts illustrating the exclusion processing on other users for the reserved print resource according to the present exemplary embodiment. The above-described processing for reserving the print resource is performed before the procedure in FIG. 8 is performed.

Turning to FIG. 8, in step S801, the PC 200 performs printer driver processing to generate a print job, and outputs the print job to the image forming apparatus 100. After the print job is input to the image forming apparatus 100, in step S802, the image forming apparatus 100 performs page generation processing to generate image data corresponding to the print job. Then, in step S803, the image forming apparatus 100 performs the print processing of the print job.

The printer driver processing will now be described. The printer driver processing is started in response to the user of the PC 200 performing an operation of issuing an instruction to carry out printing by, for example, the document generation application. Document data indicating the content to be printed (e.g., a document, a graphic, or the like) is generated in advance using the document generation application.

The printer driver 202 performs setting processing for setting attribute information about the print job based on the user's operation. Examples of the attribute information include, but are not limited to, the size and the type of the sheet used in printing and the setting information about the sheet feeding cassette. A choice, such as an "automatic selection", which leaves the selection to the image forming apparatus 100, can be provided for sheet size and type and the setting of a sheet feeding cassette. The driver software sets information specifying the sheet size and type and the setting of a sheet feeding cassette based on the user's operation input on a print setting screen.

The printer driver 202 sets an owner name and a document name of the print job. The owner name refers to information for identifying the user that created the print job, and is the identification (ID) of the user currently logged into the PC 200 according to the present exemplary embodiment. The document name refers to information for identifying the data file, such as the document or the graphic to be printed, and is acquired from, for example, the application that generates the document data according to the present exemplary embodiment.

The printer driver 202 generates PDL data compatible with the PDL format based on the document data and various kinds of setting information. The PDL data includes page data indicating the content to be drawn on each page, and the setting information about the print job (e.g., the sheet size, the sheet type, the sheet feeding deck, the owner name, the document name, etc.). The page data is image information generated by the printer driver 202 based on the document data compatible with the PDL format. The generated PDL data is transmitted to the image forming apparatus 100.

The page generation processing will now be described. The print job, which includes the page data as the image information compatible with the PDL format, transmitted from the PC 200 is received by the data reception unit 213 and temporarily stored. The page data is analyzed by the interpreter 214 and is converted into intermediate data. The setting information about the print job, such as the sheet size that is contained in the PDL data, is extracted through the analysis conducted by the interpreter 214 and is stored in the storage unit 220 by the control unit 219. The renderer 216 then performs raster image processor (RIP) processing on the intermediate data and stores the result thereof into the image data storage unit 217.

The print processing will be described with reference to FIG. 9. After the print processing is started, in step S901, the control unit 219 initializes a parameter P indicating the page currently in process (the current sheet). The parameter P is an integer value satisfying $P \geq 1$. In step S902, the control unit 219 determines whether the parameter P is greater than a variable Pmax indicating the total number of pages (the number of sheets specified in the print job), and repeatedly performs the following processing (steps S903 to S908) as long as the parameter P is $P \leq Pmax$. The variable Pmax is extracted through the analysis of the PDL data and is stored in the storage unit 220.

In step S903, the control unit 219 performs sheet feeding determination processing that acquires the information about the sheet feeding deck setting set in the printer driver processing from the storage unit 220 and determines whether the sheet can be fed from the specified sheet feeding deck. The sheet feeding determination processing will be now described in detail. If the sheet is determined to be able to be fed in the sheet feeding determination processing, then in step S904, a single sheet is fed. In step S905, the control unit 219 reads out the image data for the sheet currently in process from the image data storage unit 217. In step S906, the control unit 219 converts the read image data into video data and transfers it to the printer engine 110. Then, in step S907, the printer engine 110 performs the print processing (an image forming process) on the sheet based on the video data. After that, in step S908, the control unit 219 increments the parameter P. The process then returns to step S902.

If in step 902, if the control unit 219 determines the parameter P is greater than Pmax, the print processing ends.

The sheet feeding determination processing of step S903) in FIG. 9 will now be described with reference to a flowchart in FIG. 10 for the sheet feeding cassette 102 set as the reservation target in the present exemplary embodiment as a description of the exclusion processing on other users for the print resource during the reservation time.

Figure 10:
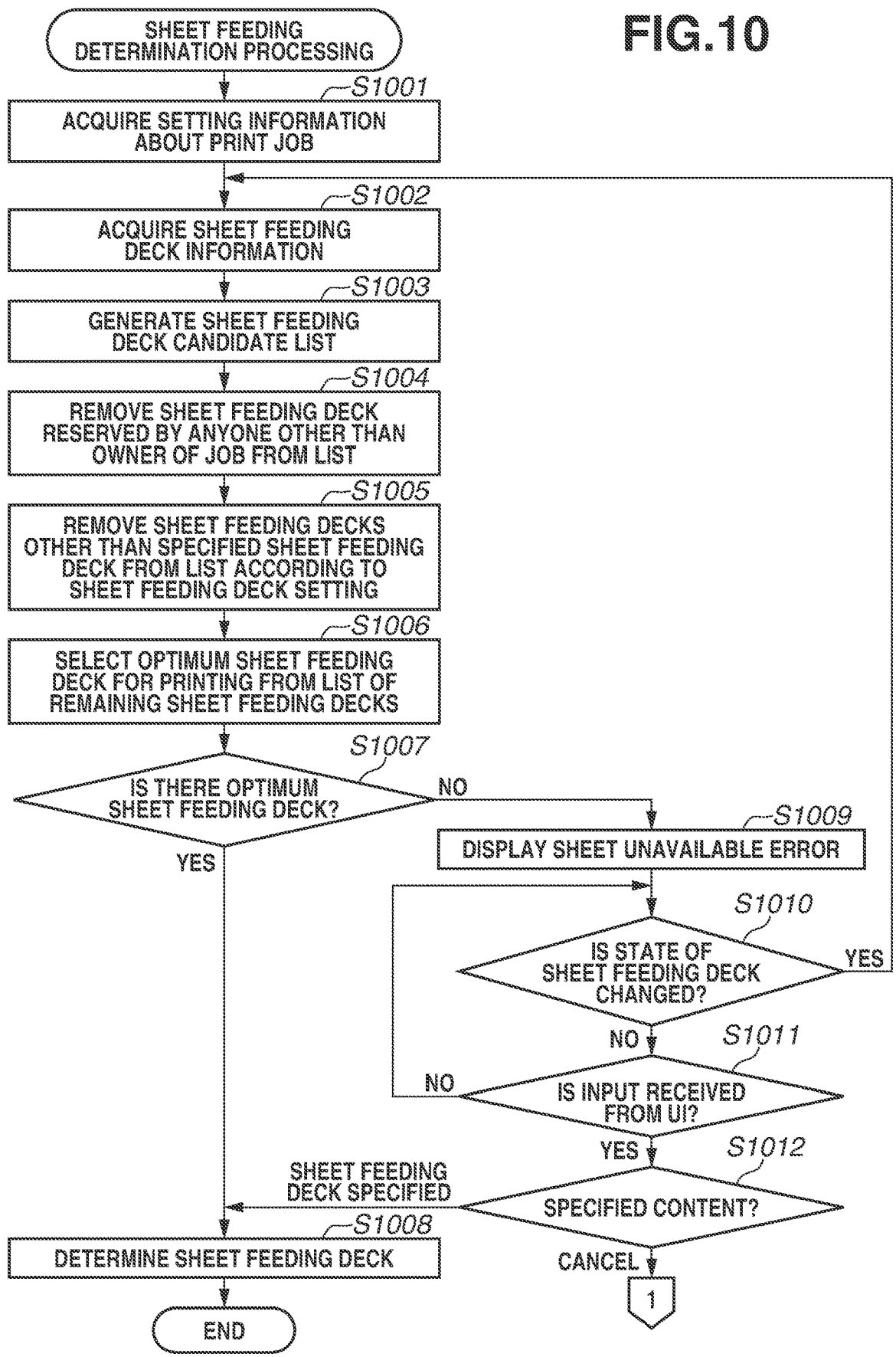
FIG. 10 is a flowchart illustrating a procedure of sheet feeding determination processing in the print processing.

Turning to FIG. 10, in step S1001, the control unit 219 acquires the setting information about the print job stored in the storage unit 220 in the page generation processing. The setting information about the print job includes, but is not limited to, the owner name of the job, the sheet size for the printing, the sheet type, and the setting information about the sheet feeding deck. Next, in step S1002, the control unit 219 acquires the sheet feeding deck information stored in the storage unit 220. The sheet feeding deck information refers to information created by organizing the information stored in the management table for the sheet feeding cassettes indicated in the above-described Table 1.

In step S1003, the acquired sheet feeding deck information is copied as a sheet feeding deck candidate list, and is used to determine the sheet feeding deck that becomes a sheet feeding candidate in the subsequent processing. Next, in step S1004, the control unit 219 compares the reservation user recorded in association with each sheet feeding deck in the sheet feeding deck candidate list and the job owner acquired in step S1001. If there is a sheet feeding deck reserved by anyone other than the job owner, the sheet feeding deck in question is removed from the sheet feeding deck candidate list. For example, if the job owner is User 01 and the reservation condition with the sheet feeding decks is as indicated in Table 1, no sheet feeding deck is removed from the sheet feeding deck candidate list. If the job owner is anyone other than User 01, the sheet feeding cassette 102 is removed from the sheet feeding deck candidate list.

In step S1005, the control unit 219 refers to the sheet feeding deck setting information in the setting information about the print job acquired in step S1001, and removes the candidates other than the specified sheet feeding deck from the sheet feeding deck candidate list.

The sheet feeding deck setting information is information specified in the printer driver processing. If a specific sheet feeding deck is specified in the printer driver processing, the candidates other than the specified sheet feeding deck are removed from the sheet feeding deck candidate list. If the automatic selection is set, no sheet feeding deck is removed from the sheet feeding deck candidate list.

In step S1006, the control unit 219 selects an optimum sheet feeding deck from the sheet feeding decks remaining in the sheet feeding deck candidate list. More specifically, the control unit 219 searches the sheet feeding deck candidate list to determine whether there is a sheet feeding deck storing a sheet that matches the sheet size and the sheet type for the printing in the setting information about the print job.

In step S1007, a determination is made whether there is an optimum sheet feeding deck, i.e., the following processing is switched depending on the result of the search for the sheet feeding deck. If the intended sheet feeding deck is discovered (YES in step S1007), then in step S1008, the specific sheet feeding deck is determined. The sheet feeding determination processing then ends.

Figure 11:
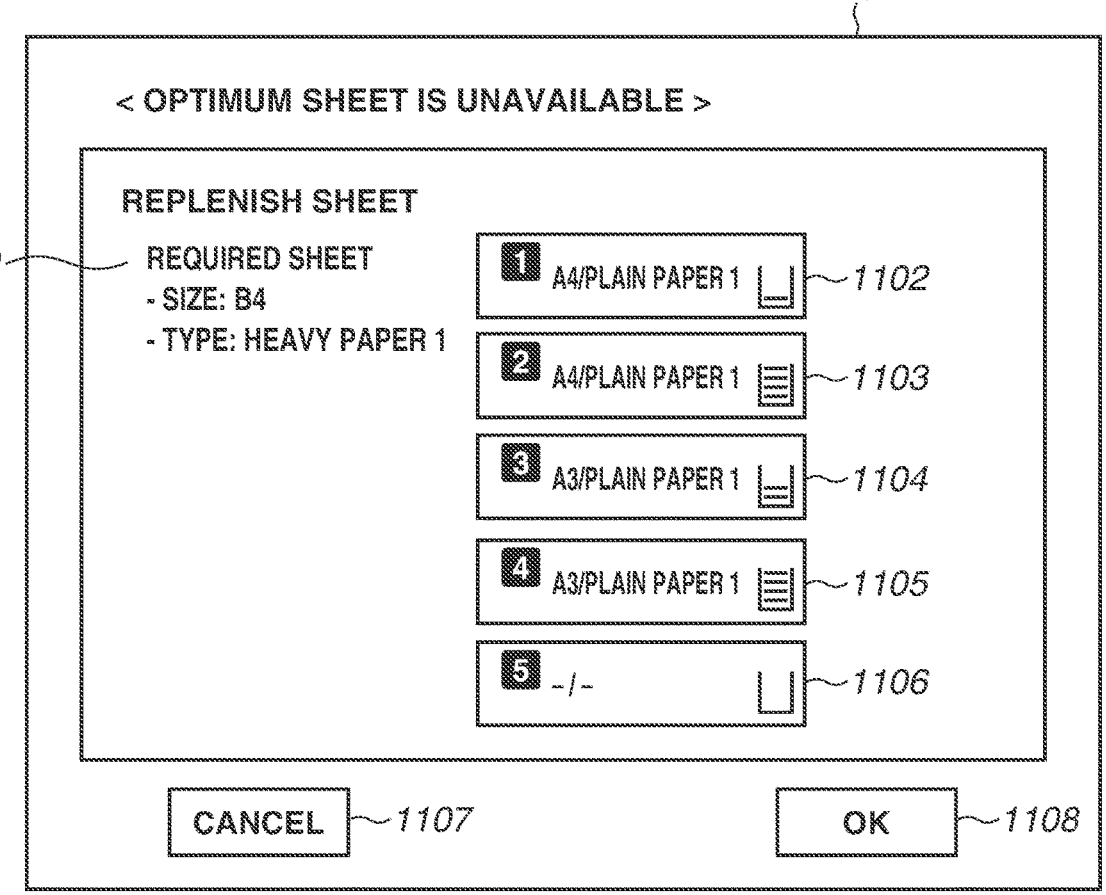
FIG. 11 is a display example of a sheet unavailable error screen.

If the intended sheet feeding deck is not discovered in step S1007 (NO in step S1007), then in step S1009, the control unit 219 displays a sheet unavailable error screen 1101 illustrated in FIG. 11 on the UI screen 218 of the image forming apparatus 100. Information (the size and the type) about the sheet to continue the print job (1109) is displayed on the sheet unavailable error screen 1101.

Operations that the user can perform at this time include, but are not limited to:
  a) clear the sheet unavailable error by loading the sheet indicated in the sheet information 1109 into any of the sheet feeding decks.
  b) forcibly continue the processing using a sheet different from the one indicated in the sheet information 1109 by selecting any of sheet feeding deck selection buttons 1102 to 1106.
  c) cancel the print job by selecting a cancel button 1107.

The control unit 219 waits for a user to perform one of the above-described operations.

In step S1010, a determination is made whether any change is made to the state of the sheet feeding deck. If a change is made (YES in step S1010), the processing returns to step S1002, taking into account that the sheet may have been loaded by the user, and the control unit 219 performs the processing for searching for the optimum sheet feeding deck again. If no change is made, then in step S1011, if an instruction issued from the user on the UI screen 218 is detected (YES in step S1011), the processing proceeds to step S1012. In step S1012, if any of the sheet feeding deck selection buttons 1102 to 1106 is selected (SHEET FEEDING DECK SPECIFIED), the process proceeds to step S1008 and the processing then ends. If selection of the cancel button 1107 is detected in step S1012 (CANCEL), the print processing ends. If no input is received in step S1011, the processing returns to step S1010.

As described above, the present configuration enables restricting users other than the "reserver" from using the sheet feeding deck with the aid of the processing for reserving the sheet feeding deck, preventing users other than the "reserver" from accidental use of the sheet through a reservation of a sheet feeding deck in which sheets including expensive sheets, such as coated paper, are loaded in advance.

A second exemplary embodiment will now be described. In the above-described embodiment, storage of the information about the reservation into the storage unit 220 in the image forming apparatus 100 enables the exclusion control on other users for the print resource during the reservation time.

In an environment where all users using an image forming apparatus 100 are permitted to make reservations, this can result in situations that prevent a user from making a reservation where many users have reserved print resources. This reduces the time when users without reservations can use the image forming apparatus.

According to the present exemplary embodiment, a configuration is provided that selects and grants a user reservation authorization, which enables a specific user to reserve a print resource. In the present exemplary embodiment, the scheduler server 205 provides the reservation information to the image forming apparatus 100 every time the scheduler server 205 receives a reservation and checks whether the reservation authorization is granted. The present exemplary embodiment also provides a method of providing the reservation information to the image forming apparatus 100 in response to when the scheduler server 205 receives a reservation.

Figure 12A:
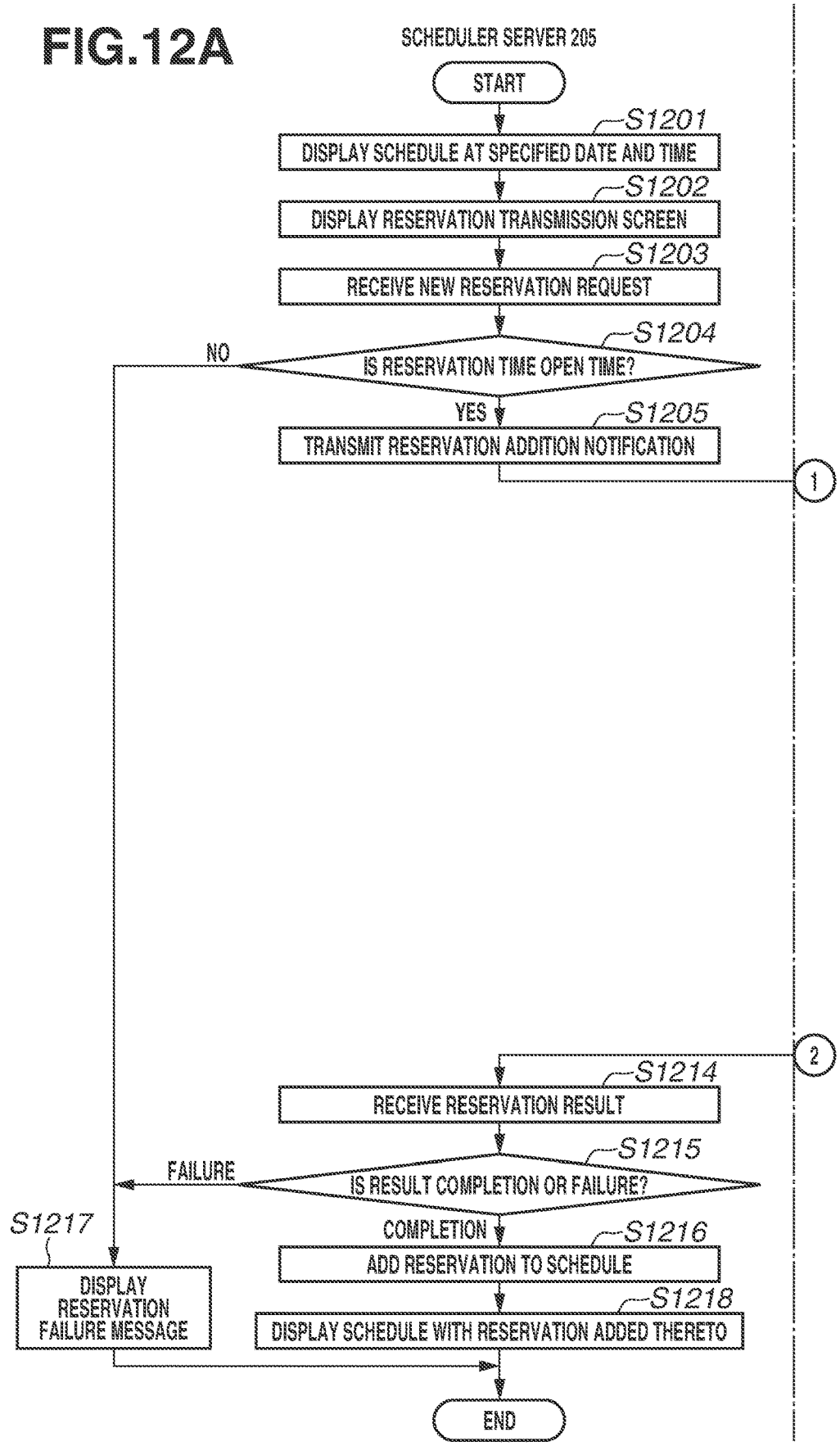
FIGS. 12A and 12B are a flowchart illustrating a procedure of a reservation in consideration of reservation authorization.
Figure 12B:
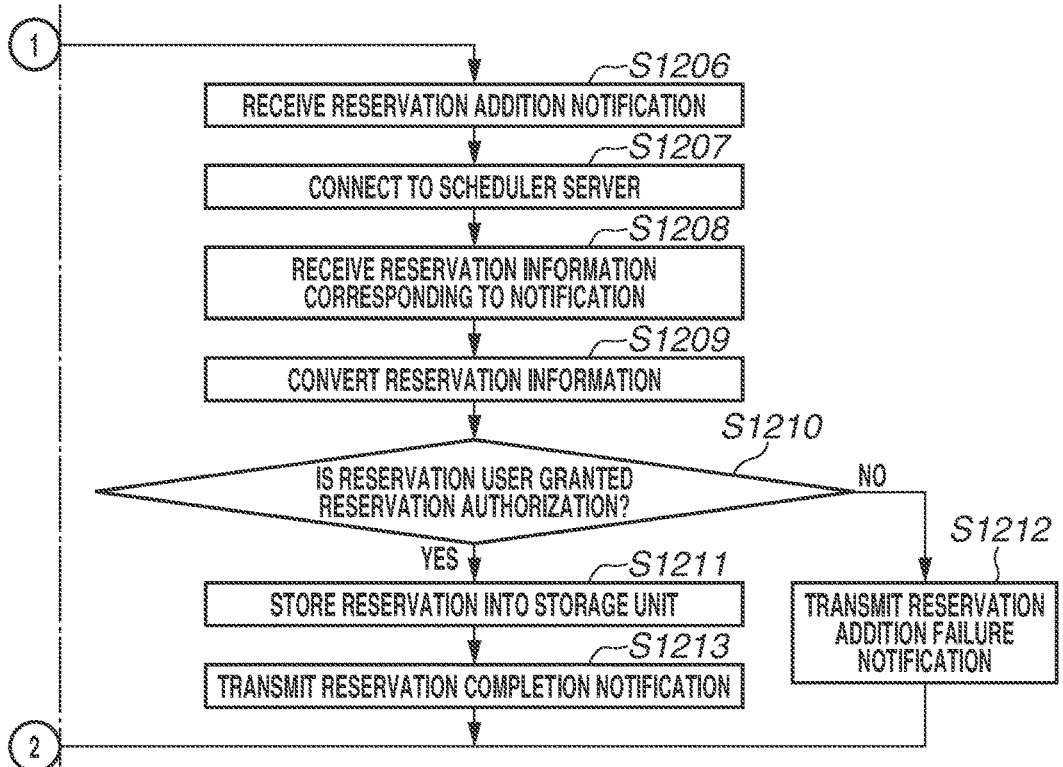

FIGS. 12A and 12B are flowcharts illustrating the procedure associated with a configuration that determines whether the user is granted the reservation authorization and then enables the user determined to be granted the reservation authorization to make reservations for print resources of the image forming apparatus in the present exemplary embodiment. In the present example, the sheet feeding cassette 102 is subject to reservation. Operations similar to steps S601 to S604 in FIG. 6 are performed in steps S1201 to S1204 in FIG. 12A, and thus detailed descriptions of the steps are omitted herein. The process from steps S1205 to S1213 are described below.

If the schedule is determined to be open in step S1204 (YES), in step S1205, the scheduler server 205 transmits a reservation addition notification indicating that the reservation information about the sheet feeding cassette 102 is received to the image forming apparatus 100.

Next, in step S1206 in FIG. 12B, the image forming apparatus 100 receives the reservation addition notification transmitted from the scheduler server 205.

In step S1207, the image forming apparatus 100 connects to the scheduler server 205 to establish communication between the image forming apparatus 100 and the scheduler server 205.

In step S1208, the image forming apparatus 100 receives the reservation information corresponding to the reservation addition notification received in step S1205. At this time, the image forming apparatus 100 receives a single set of reservation information.

In step S1209, the image forming apparatus 100 converts the information representing the reservation information received in step S1203 into the reservation information recognizable by the control unit 219 using the above-described server information management table.

In step S1210, the image forming apparatus 100 refers to a user information management table (Table 2) stored in the storage unit 220 and determines whether the user having the username attempting to make the reservation is granted the reservation authorization (2103). The user information management table stores information regarding users registered with the image forming apparatus 100.

If the user is determined to be granted the reservation authorization (YES in step S1210), the processing proceeds to step S1211. If the user is determined not to be granted the reservation authorization (NO in step S1210), the processing proceeds to step S1212. The reservation authorization can be granted by a user having administrator privilege of the image forming apparatus 100, which is indicated with YES in administrator privilege 2102.

TABLE 2

User Information Management Table

| Username (2101) | Administrator Privilege (2102) | Reservation Authorization (2103) |
|---|---|---|
| USER 01 | NO | YES |
| USER 02 | YES | YES |
| USER 03 | NO | NO |

In step S1211, the image forming apparatus 100 stores the information converted based on the server information conversion table into the resource information management table for managing the information about the reserved print resource. More specifically, the image forming apparatus 100 performs an operation similar to the operation performed in step S705 in FIG. 7.

Then, in step S1213, the image forming apparatus 100 transmits a reservation completion notification to the scheduler server 205. The process then proceeds to step S1214 in FIG. 12A.

In step S1212, the image forming apparatus 100 transmits a reservation failure notification to the scheduler server 205. The reservation information is not be stored into the storage unit 220. Thus, the image forming apparatus 100 transmits a notification to the scheduler server 205 regardless of whether the reservation information is stored into the storage unit 220. The process then proceeds to step S1214.

In step S1214, the scheduler server 205 receives the reservation result from the image forming apparatus 100. In step S1215, the scheduler server 205 determines whether the result is the completion or the failure. If the received result is determined to be the completion (COMPLETION), the processing proceeds to step S1216. If the received result is determined to be the failure (FAILURE), the processing proceeds to step S1217.

In step S1216, the scheduler server 205 registers the reservation information with the schedule of the sheet feeding cassette 102.

Next, in step S1218, the schedule of the sheet feeding cassette 102 with the reservation information about the reservation user added thereto is displayed on the PC 200 via the schedule management application 204. The process then ends. In step S1217, the scheduler server 205 notifies the reservation user that the received reservation information cannot be reserved. The process then ends.

Examples of the notification method include, but are not limited to, a method such as displaying a pop-up screen on the PC 200 and/or transmitting an electronic mail from the scheduler server 205 to the reservation user. After being notified that the reservation cannot be registered, the reservation user can search for another open time of the reservation target and perform the reservation operation again on the schedule management application screen.

According to the present exemplary embodiment, the environment that a reservation user granted reservation authorization in advance is permitted to make reservations enables the reservation user to reserve print resources of the image forming apparatus 100 using the scheduler server 205. In the present exemplary embodiment, since the reservation information is also stored in the storage unit 220 in the image forming apparatus 100, the image forming apparatus 100 can also perform the exclusion control on other users for the print resource during the reservation time.

A third exemplary embodiment will now be described. According to the previous exemplary embodiments, the scheduler server 205 executed reserving print resources in the image forming apparatus 100. According to the present exemplary embodiment, the image forming apparatus 100 can execute reserving the print resources. FIG. 13 is a flowchart illustrating a reservation operation of the present exemplary embodiment. The scheduler server 205 corresponds to another apparatus in the present exemplary embodiment. The following is a description where the user (the username: User 01) performs an operation of loading the following special sheet in the sheet feeding cassette 102 and then reserving the sheet feeding cassette 102:
  sheet size: A4
  sheet type: coated paper First, User 01 loads the above-described special sheet into the sheet feeding cassette 102. Then, User 01 operates the UI screen 218 of the image forming apparatus 100 to set the size and the type of the loaded sheet.

Figure 14:
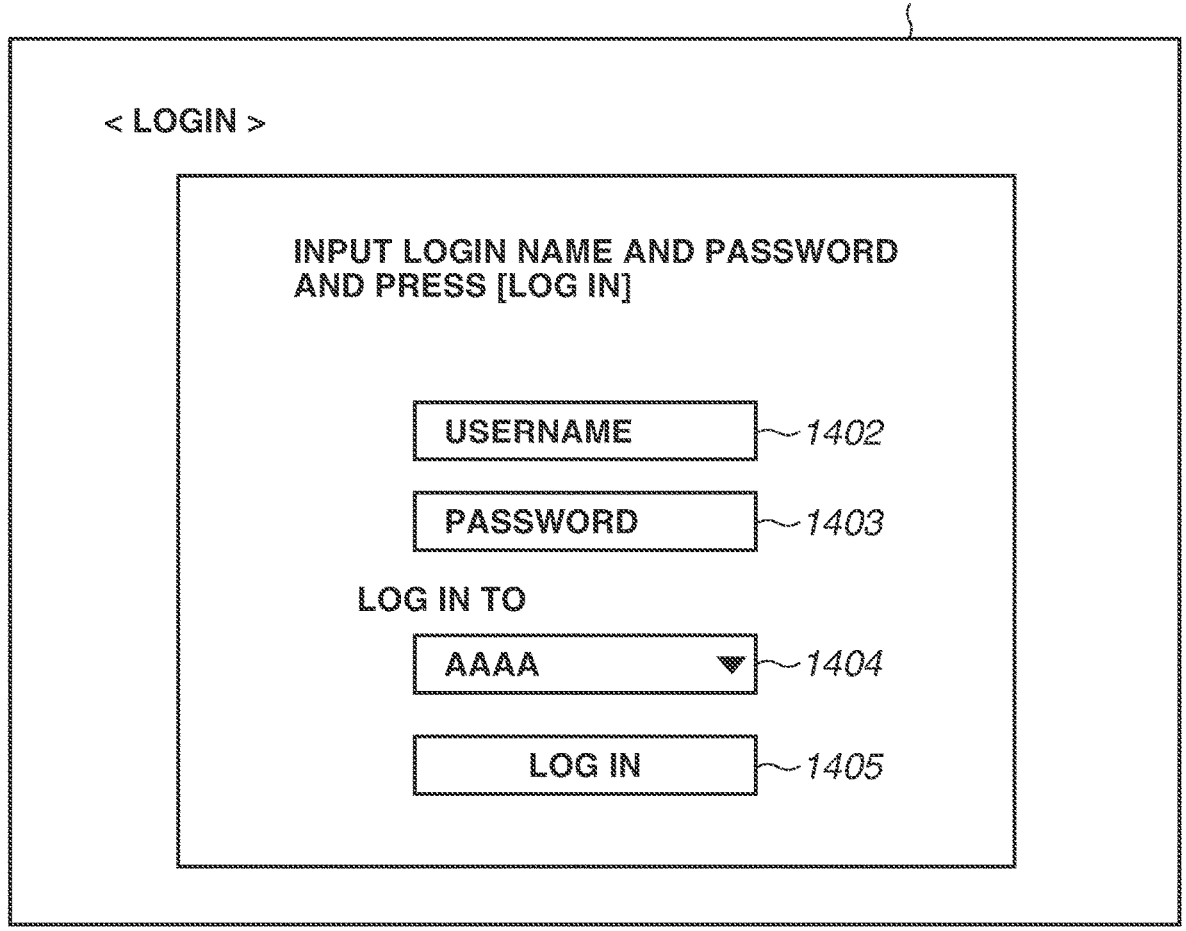
FIG. 14 is a display example of a login screen on the image forming apparatus.
Figure 15:
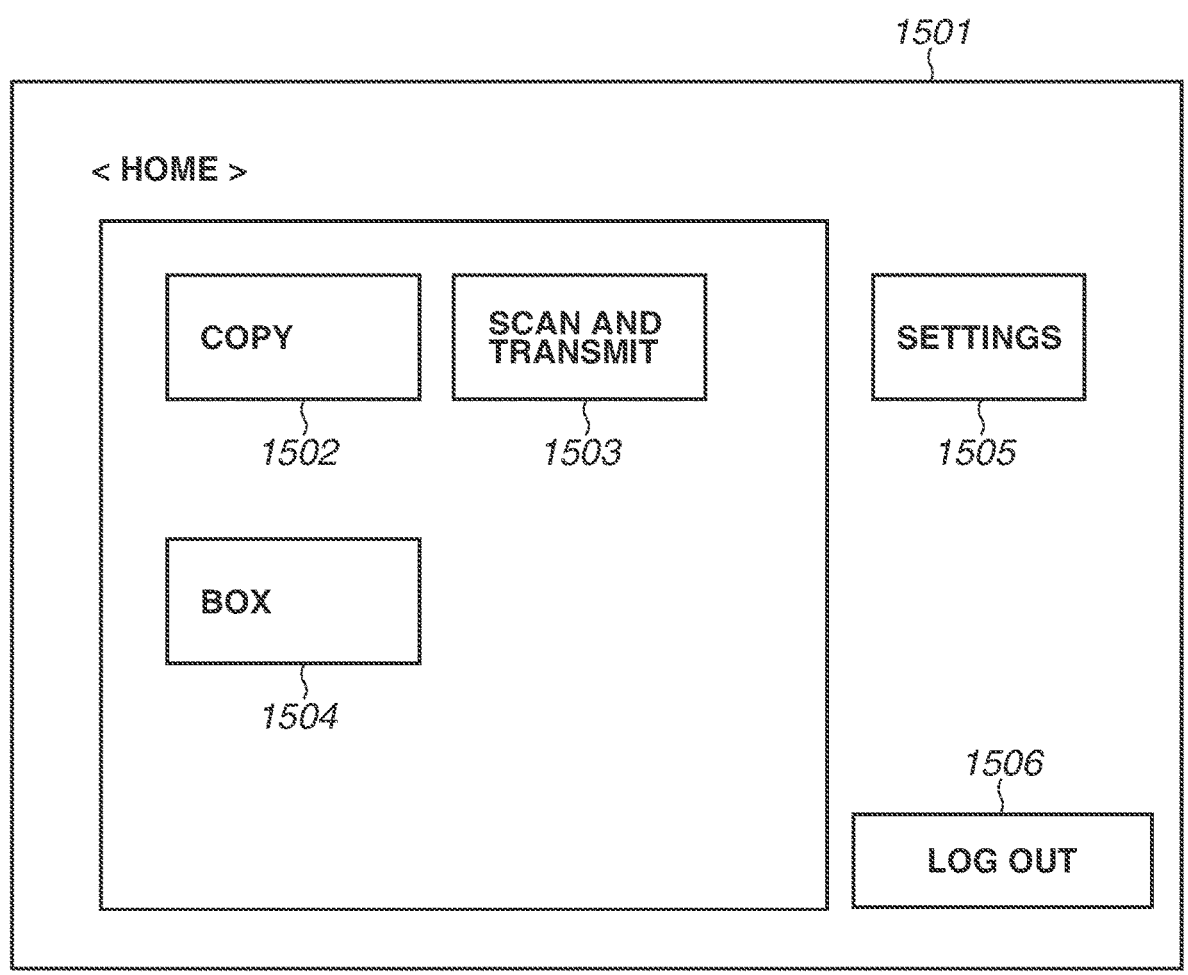
FIG. 15 is a display example of a home screen on the image forming apparatus.

In step S1301, the control unit 219 of the image forming apparatus 100 displays a screen 1401 for conducting user authentication, as illustrated in FIG. 14, on the UI screen 218, and waits for an operation from the user. Input fields 1402 and 1403 for receiving a username and a password, a selection field 1404 for selecting a login destination, and a login button 1405 for determining an input and starting authentication processing are included on the screen 1401 for conducting the user authentication. In response to the detection of a selection of the login button 1405, in step S1302, the control unit 219 performs the authentication processing based on the input information. If the authentication fails in step S1302, the process returns to step S1301. If the authentication is completed in step S1302 (YES), then in step S1303, the control unit 219 displays a home screen 1501 illustrated in FIG. 15 on the UI screen 218.

A button 1502 selected for the copy function to use, a button 1503 selected for the transmission function to use, and a button 1504 selected for the box function to use are located on the home screen 1501. A button 1505 is a button for configuring various kinds of settings of the image forming apparatus 100, and the setting button 1505 is also selected to set the size and the type of the sheet loaded by the above-described user User 01, and to reserve the sheet feeding deck.

Figure 16:
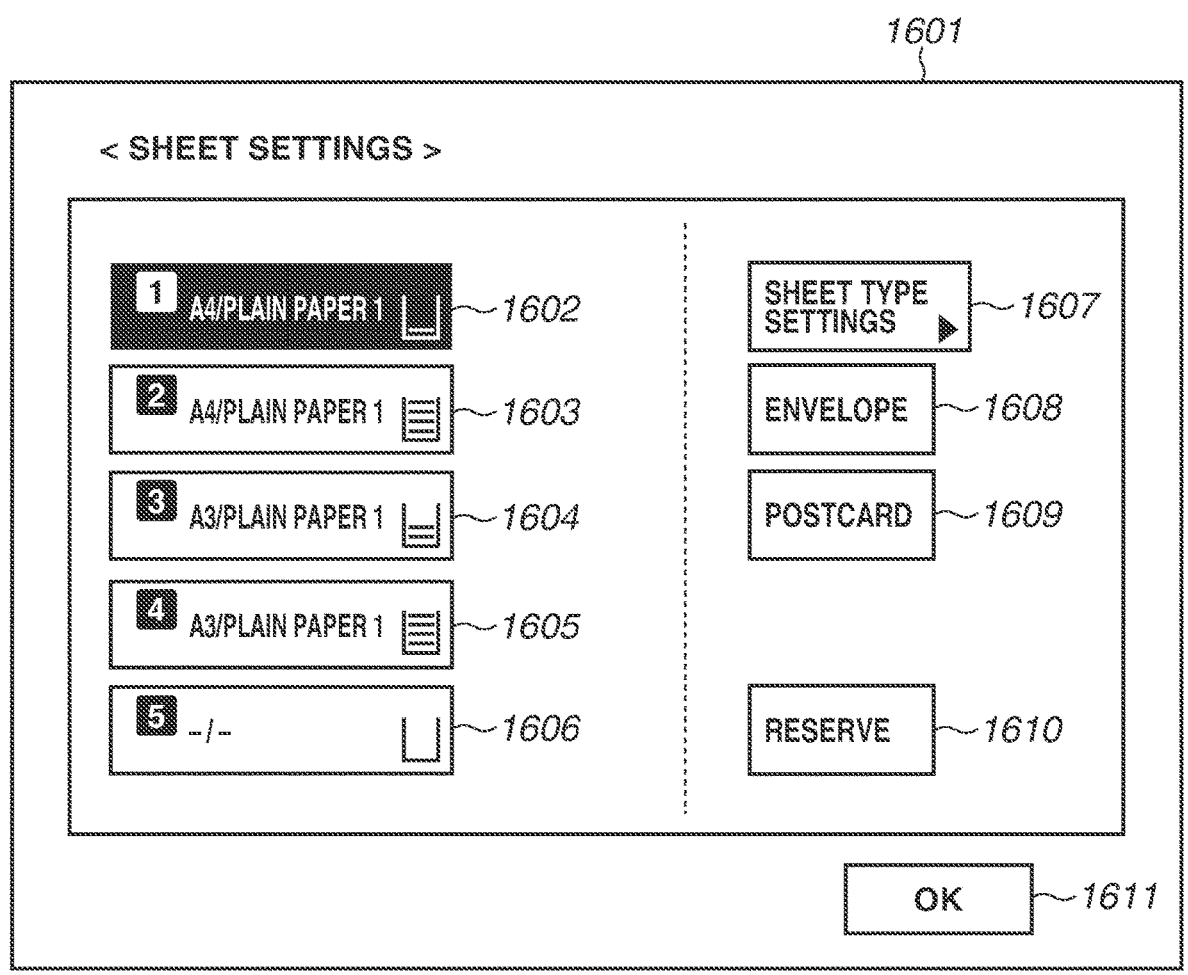
FIG. 16 is a display example of a sheet setting screen on the image forming apparatus.

In response to the detection of a selection of the various kinds of settings button 1505, the control unit 219 of the image forming apparatus 100 displays a screen (not illustrated) enabling the user to select various setting items. In response to the control unit 209 detecting selection of a button for setting the sheet from among the various kinds of setting items, in step S1304, the control unit 219 displays a screen 1601 for setting the sheet that is illustrated in FIG. 16.

Sheet feeding deck selection buttons 1602 to 1606 are displayed on the sheet setting screen 1601, and the setting state of each sheet feeding deck is displayed at each of the buttons 1602 to 1606. The sheet size 2002, the sheet type 2003, and the sheet remaining quantity 2004 of each of the sheet feeding cassettes in Table 1 are displayed at each of the buttons 1602 to 1606. A button 1607 for changing the sheet type and buttons 1608 and 1609 for setting the sheet size to a special size, such as an envelope or a postcard, are located on the same screen, along with a reservation button 1610. Setting button 1607 to 1610 are each operated after any of the above-described sheet feeding deck selection buttons 1602 to 1606 is selected.

Figure 17:
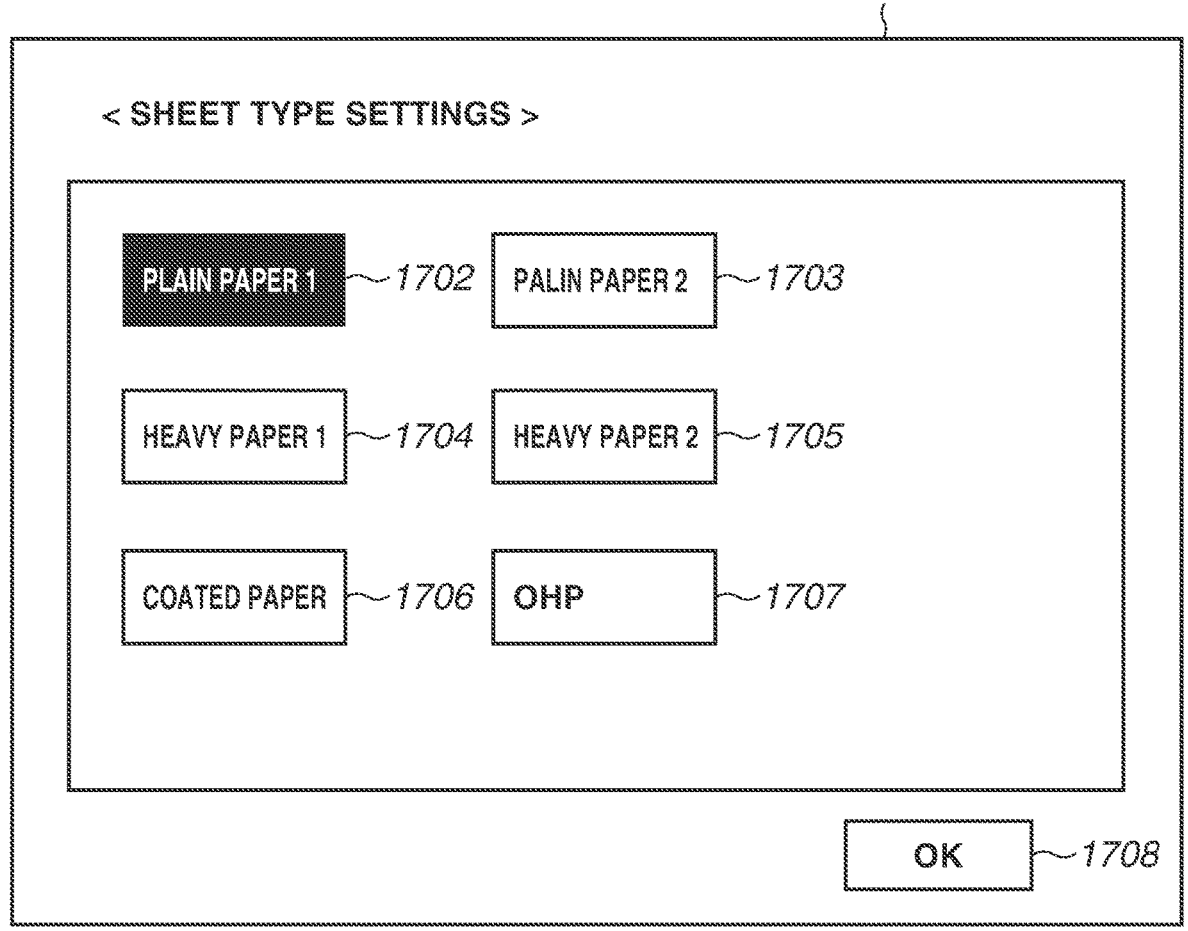
FIG. 17 is a display example of a sheet type setting screen on the image forming apparatus.

Next, an operation when the button corresponding to the sheet feeding cassette 102 is selected and the sheet type setting button 1607 is selected will be described with reference to FIG. 17 and FIG. 18. In response to the detection of a selection of the sheet type setting button 1607, the control unit 219 of the image forming apparatus 100 displays a sheet type setting screen 1701 illustrated in FIG. 17 on the UI screen 218. The control unit 219 then acquires the sheet type set to the selected sheet feeding deck (the sheet feeding cassette 102 in the present example) from the sheet feeding deck information stored in the storage unit 220, and displays it. FIG. 17 illustrates a state where plain paper 1 (1702) is set. In addition to the plain paper 1 (1702), plain paper 2 (1703), heavy paper 1 (1704), heavy paper 2 (1705), coated paper (1706), and another type of sheet (1707) are also selectable via the sheet type setting screen 1701. The user selects the sheet type and selects an OK button 1708 there. In response to selection of the OK button 1708, the control unit 219 updates the above-described sheet feeding deck information, and completes the setting of the sheet type.

Next, an operation for reserving the sheet feeding deck will be described. In response to the control unit 219 of the image forming apparatus 100 detecting a selection of the reservation button 1610 with the button 1602 corresponding to the sheet feeding cassette 102 selected, in step S1305, the control unit 219 records the username of the current login user in the reservation user field of the sheet feeding deck information saved in the storage unit 220. This finalizes the reservation of the sheet feeding cassette 102 by User 01. To cancel the reservation, the reservation button 1110 is pressed again, clearing the reservation user field in the sheet feeding deck information stored in the storage unit 220.

The storage of the reservation information in the storage unit 220 in the third exemplary embodiment also enables the image forming apparatus 100 to perform the exclusion processing on other users like the processing illustrated in FIG. 10, similar to the first exemplary embodiment and the second exemplary embodiment.

A fourth exemplary embodiment will now be described. Regarding the method for providing the reservation information to another apparatus, the reservation information is shared by being connected to the apparatus every time the predetermined time elapses in the above-described first exemplary embodiment. According to the second exemplary embodiment, the reservation information is shared by being connected to the apparatus every time the reservation is received. These two methods can be employed both when an apparatus that reserves print resources is the image forming apparatus 100 and when an apparatus that reserves print resources is the scheduler server 205. Thus, either of these methods can also be employed in the third exemplary embodiment.

If an apparatus that reserves print resources is the scheduler server 205, the print resource reservation system can also employ a method in which the image forming apparatus 100 connects to the scheduler server 205 in response to receiving a print job and acquires the reservation information.

Figure 18:
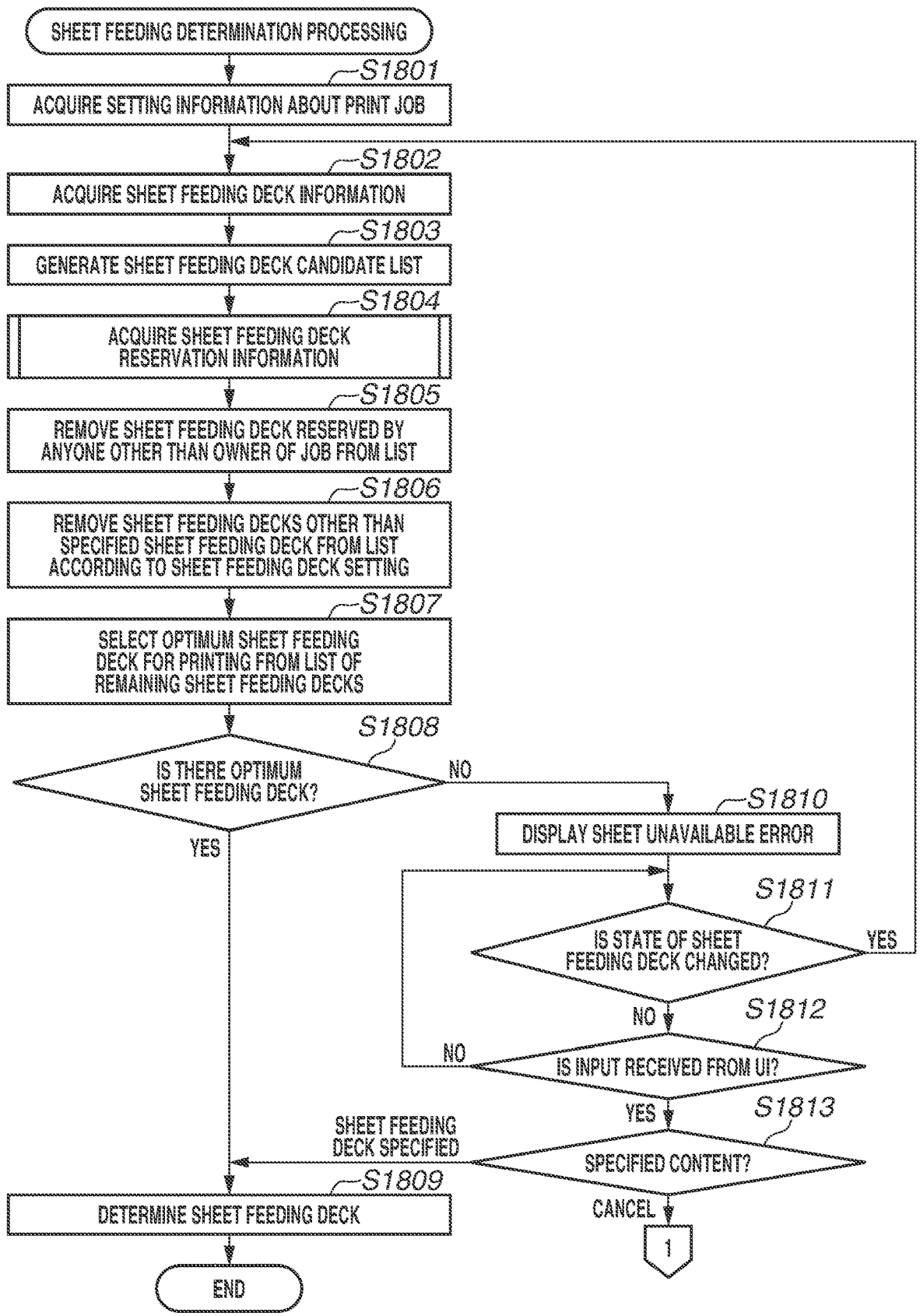
FIG. 18 is a flowchart illustrating a procedure of sheet feeding determination processing including acquiring the reservation information when the print job is input.
Figure 19:
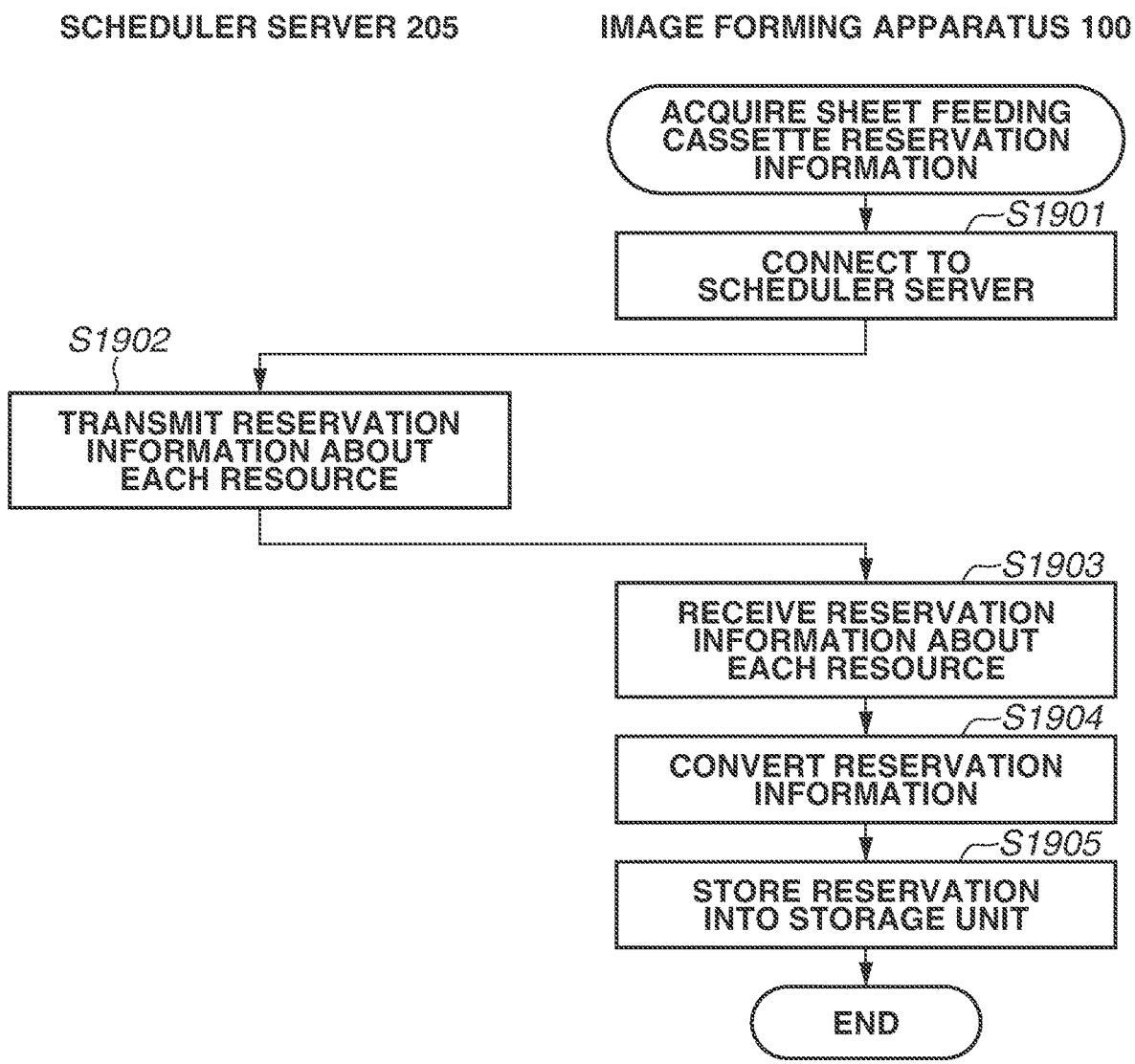
FIG. 19 is a flowchart illustrating a procedure of acquiring the reservation information.

FIGS. 18 and 19 are flowcharts illustrating a procedure according to the present exemplary embodiment where the image forming apparatus 100 inquires of the scheduler server 205, acquires the reservation information, and determines whether the print job can be run. The sheet feeding cassette 102 is reserved similarly to the previous exemplary embodiments. The reservation operation is already performed on the scheduler server 205 as illustrated in FIG. 6. FIG. 18 corresponds to FIG. 10 except that the process of acquiring the sheet feeding deck reservation information (step S1804) is added after the generation of the sheet feeding deck candidate list (step S1003) in FIG. 10. As such, while the reference numbers in FIG. 18 differ from those in FIG. 10, only step S1804 will be referred to herein. In step S1804, the image forming apparatus 100 acquires the sheet feeding deck reservation information after generating the sheet feeding deck candidate list during the print processing.

Turning to FIG. 19, in step S1901, the image forming apparatus 100 connects to the scheduler server 205. Then, in step S1902, the scheduler server 205 transmits to the image forming apparatus 100 the reservation information about the sheet feeding cassettes and the sheet discharge trays grouped as the print resources of the image forming apparatus 100.

In step S1903, the image forming apparatus 100 receives the reservation information from the scheduler server 205. In step S1904, the image forming apparatus 100 converts the received reservation information into the reservation information recognizable by the control unit 219 using the server information management table.

In step S1905, the image forming apparatus 100 stores the converted information into the resource information management table in the storage unit 220. The process then ends.

Returning to FIG. 18, the remaining steps following step S1804 are identical to steps S1004 through step S1012 in FIG. 10 and as such the detailed description of the remaining steps of FIG. 18 are omitted herein.

The processing of the present exemplary embodiment enables the image forming apparatus 100 to access the scheduler server 205 to acquire the reservation information therefrom and store the reservation information into the storage unit 220 in response to receiving the print job.

Since the reservation information is also stored in the storage unit 220 in the image forming apparatus 100 in the present exemplary embodiment, the processing of the present exemplary embodiment also enables the image forming apparatus 100 to restrict the print jobs of another user using the reserved print resource during the reservation time.

The above-described exemplary embodiments have been described a print job being input from the printer driver 202. Each of the above-described exemplary embodiments can be implemented using a copy job in place of a print job.

A main difference between a print job and a copy job is whether the page data read out from the image data storage unit 217 in step S905 in the print processing is generated based on the data input from the printer driver 202 or generated by the scanner unit 109. There is no difference between the print job and the copy job in the processing for reserving the print resource and the sheet feeding determination processing in step S903.

The above-described exemplary embodiments have been described with respect to the sheet feeding cassette 102 being reserved. In another exemplary embodiment, a similar operation can also be performed when the sheet discharge tray, the scanner, or the printer, which are print resources different from the sheet feeding cassette is reserved. In addition, exclusion processing on other users to be performed with a print resource different from the sheet feeding cassette being reserved can also be implemented.

The above-described configurations and operations of the image forming apparatus 100 and the scheduler server 205 are not seen to be limiting, and any configurations that enable practice of the present disclosure are applicable.

The configurations according to the above-described exemplary embodiments enable an image forming apparatus to prohibit other users from using special sheets when a special sheet is ready to be used on the image forming apparatus.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2021-100276, filed Jun. 16, 2021, which is hereby incorporated by reference herein in its entirety.

What is claimed is:

1. An image forming apparatus comprising:
a sheet storage;
at least one memory; and
at least one processor, functioning to:
perform, based on an instruction from a first user, restriction on the sheet storage,
prohibit a second user, who is different from the first user, from performing a print operation using the restricted sheet storage;
wherein the restriction of the sheet storage is performed based on the instruction received via a schedule management service.

2. The image forming apparatus according to claim 1, further comprising
a communicator,
wherein the communicator receives the instruction from an electronic mail address associated with the sheet storage.

3. The image forming apparatus according to claim 2, wherein the communicator transmits a notification indicating that a reservation for restricting the sheet storage has been completed to the schedule management service.

4. The image forming apparatus according to claim 1, wherein the at least one processor does not prohibit the second user from performing a print operation using a sheet storage which is not restricted.

5. An information processing apparatus configured to receive information provided from an image forming apparatus, the image forming apparatus including a plurality of sheet storages, the information processing apparatus comprising:
a controller,
wherein the controller displays each of the plurality of sheet storages on a display, and
wherein the controller receives an instruction to restrict one of the plurality of sheet storages; and
a communicator that transmits an instruction for restricting the sheet storages,
wherein the communicator transmits the instruction from an electronic mail address associated with the sheet storage.

6. A method implemented by an image forming apparatus having a sheet storage, the method comprising:
performing, based on an instruction from a first user, restriction of the sheet storage; and
prohibiting a second user, who is different from the first user, from performing a print operation using the restricted sheet storage,
wherein the restriction of the sheet storage is performed based on the instruction received via a schedule management service.

7. The method according to claim 6, further comprising:
receiving the instruction from an electronic mail address associated with the sheet storage.

8. The method according to claim 6, further comprising:
transmitting a notification indicating that a reservation for restricting the sheet storage has been completed to the schedule management service.

9. The method according to claim 6, wherein the prohibiting does not include to prohibit the second user from performing a print operation using a sheet storage which is not restricted.

10. A method implemented by an information processing apparatus that receives information provided from an image forming apparatus, the image forming apparatus including a plurality of sheet storages, the method comprising:
displaying each of the plurality of sheet storages on display;
receiving an instructions to restrict one of the plurality of sheet storages; and
transmitting an instruction for restricting the sheet storage,
wherein the instruction is transmitted from an electronic mail address associated with the sheet storage.

11. A system comprising:
an apparatus;
an information processing apparatus; and
an image forming apparatus, wherein
the apparatus comprising:
at least one memory; and
at least one processor, functioning to:
reserve a sheet feeding unit of an image forming apparatus; and
provide information indicating that the sheet feeding unit is reserved,
the image forming apparatus comprising:
at least one memory; and
at least one processor function to:
prohibit, when receiving a print job using the reserved sheet feeding unit, printing of the print job while the sheet feeding unit is reserved; and
execute a print job from a user other than a user who reserved the sheet feeding unit using a sheet feeding unit different from the reserved sheet feeding unit, and
the information processing apparatus comprising:
at least one memory; and
at least one processor, functioning to:
display each of the plurality of sheet feeding units;
receive an instruction to reserve one of the plurality of sheet feeding units; and
transmit a command for reserving the sheet feeding unit instructed to be reserved.

12. A system according to claim 11, wherein the information processing apparatus transmits the command via an electronic mail address associated with the sheet feeding unit.

* * * * *